(12) United States Patent
Singh et al.

(10) Patent No.: US 10,534,549 B2
(45) Date of Patent: Jan. 14, 2020

(54) MAINTAINING CONSISTENCY AMONG COPIES OF A LOGICAL STORAGE VOLUME IN A DISTRIBUTED STORAGE SYSTEM

(71) Applicant: Robin Systems, Inc., San Jose, CA (US)

(72) Inventors: Gurmeet Singh, San Jose, CA (US); Ripulkumar Hemantbhai Patel, Fremont, CA (US); Partha Sarathi Seetala, San Jose, CA (US)

(73) Assignee: ROBIN SYSTEMS, INC., San Jose, CA (US)

( * ) Notice: Subject to any disclaimer, the term of this patent is extended or adjusted under 35 U.S.C. 154(b) by 72 days.

(21) Appl. No.: 15/709,296

(22) Filed: Sep. 19, 2017

(65) Prior Publication Data

US 2019/0087105 A1 Mar. 21, 2019

(51) Int. Cl.
*G06F 3/06* (2006.01)
*G06F 11/14* (2006.01)

(52) U.S. Cl.
CPC ............ *G06F 3/0619* (2013.01); *G06F 3/064* (2013.01); *G06F 3/065* (2013.01); *G06F 3/067* (2013.01); *G06F 3/0665* (2013.01); *G06F 11/1435* (2013.01); *G06F 11/1451* (2013.01); *G06F 11/1464* (2013.01); *G06F 2201/84* (2013.01)

(58) Field of Classification Search
CPC .. G06F 3/0619; G06F 11/1435; G06F 3/0665; G06F 3/067; G06F 3/065; G06F 11/1451; G06F 2201/84; G06F 11/1464
See application file for complete search history.

(56) References Cited

U.S. PATENT DOCUMENTS

| 4,310,883 A | 1/1982 | Clifton |
| 6,014,669 A | 1/2000 | Slaughter |
| 6,119,214 A | 9/2000 | Dirks |

(Continued)

FOREIGN PATENT DOCUMENTS

WO WO2017008675 1/2017

OTHER PUBLICATIONS

Segment map.

(Continued)

*Primary Examiner* — Tasnima Matin
(74) *Attorney, Agent, or Firm* — David R. Stevens; Stevens Law Group

(57) ABSTRACT

A system maintains a consistency database that maintains a status (current, down, stale) for copies of logical storage volumes stored on storage nodes. As failures are detected, the consistency database is updated. Copies are synchronized with one another using information in the consistency database. Write operations on a primary node for a slice of a logical storage node are assigned a virtual block address (VBA) that is mapped to a logical block address (LBA) within the slice. Consistency of the VBAs of the primary node and that of a secondary node is evaluated and used to detect currency. VBA holes are detected and corresponding write commands resent to maintain currency. Physical segments on the primary node are assigned virtual segment identifiers (VSID) that are maintained consistent with VSIDs on clone nodes so that they can be used for garbage collection and synchronization.

18 Claims, 12 Drawing Sheets

(56) References Cited

U.S. PATENT DOCUMENTS

| | | | |
|---|---|---|---|
| 6,161,191 A | 12/2000 | Slaughter | |
| 6,298,478 B1 | 10/2001 | Nally | |
| 6,311,193 B1 | 10/2001 | Sekido | |
| 6,851,034 B2 | 2/2005 | Challenger | |
| 6,895,485 B1 | 5/2005 | Dekoning | |
| 6,957,221 B1 | 10/2005 | Hart | |
| 7,096,465 B1 | 8/2006 | Dardinski | |
| 7,171,659 B2 | 1/2007 | Becker | |
| 7,246,351 B2 | 7/2007 | Bloch | |
| 7,305,671 B2 | 12/2007 | Davidov | |
| 7,590,620 B1 | 9/2009 | Pike | |
| 7,721,283 B2 | 5/2010 | Kovachka | |
| 7,738,457 B2 | 6/2010 | Nordmark | |
| 7,779,091 B2 | 8/2010 | Wilkinson | |
| 8,121,874 B1 | 2/2012 | Guheen | |
| 8,171,141 B1 | 5/2012 | Offer | |
| 8,219,821 B1 | 7/2012 | Zimmels | |
| 8,392,498 B2 | 3/2013 | Berg | |
| 8,505,003 B2 | 8/2013 | Bowen | |
| 8,527,544 B1 | 9/2013 | Colgrove | |
| 8,601,467 B2 | 12/2013 | Hofhansl | |
| 8,620,973 B1 | 12/2013 | Veeraswamy | |
| 8,745,003 B1 | 6/2014 | Patterson | |
| 8,782,632 B1 | 7/2014 | Chigurapati | |
| 8,788,634 B2 | 7/2014 | Krig | |
| 8,832,324 B1 | 9/2014 | Hodges | |
| 8,886,806 B2 | 11/2014 | Tung | |
| 8,909,885 B2 | 12/2014 | Corbett | |
| 8,966,198 B1 | 2/2015 | Harris | |
| 9,134,992 B2 | 9/2015 | Wong | |
| 9,148,465 B2 | 9/2015 | Gambardella | |
| 9,152,337 B2 | 10/2015 | Kono | |
| 9,167,028 B1 | 10/2015 | Bansal | |
| 9,280,591 B1 | 3/2016 | Kharatishvili | |
| 9,330,155 B1 | 5/2016 | Bono | |
| 9,342,444 B2 | 5/2016 | Minckler | |
| 9,367,301 B1 | 6/2016 | Serrano | |
| 9,436,693 B1 | 9/2016 | Lockhart | |
| 9,521,198 B1 * | 12/2016 | Agarwala | G06F 12/0253 |
| 9,619,389 B1 | 4/2017 | Roug | |
| 9,635,132 B1 | 4/2017 | Lin | |
| 9,667,470 B2 | 5/2017 | Prathipati | |
| 9,747,096 B2 | 8/2017 | Searlee | |
| 9,870,366 B1 | 1/2018 | Duan | |
| 9,892,265 B1 | 2/2018 | Tripathy | |
| 9,998,955 B1 | 6/2018 | MacCarthaigh | |
| 10,019,459 B1 | 7/2018 | Agarwala | |
| 10,042,628 B2 | 8/2018 | Thompson | |
| 10,061,520 B1 | 8/2018 | Zhao | |
| 10,191,778 B1 | 1/2019 | Yang | |
| 10,282,229 B2 | 5/2019 | Wagner | |
| 2004/0153703 A1 | 8/2004 | Vigue | |
| 2005/0065986 A1 | 3/2005 | Bixby | |
| 2005/0216895 A1 | 9/2005 | Tran | |
| 2006/0085674 A1 | 4/2006 | Ananthamurthy | |
| 2007/0006015 A1 | 1/2007 | Rao | |
| 2007/0067583 A1 * | 3/2007 | Zohar | G06F 11/1458 711/162 |
| 2007/0260842 A1 | 11/2007 | Faibish | |
| 2007/0288791 A1 | 12/2007 | Allen | |
| 2008/0189468 A1 | 8/2008 | Schmidt | |
| 2008/0270592 A1 | 10/2008 | Choudhary | |
| 2009/0144497 A1 | 6/2009 | Withers | |
| 2009/0172335 A1 | 7/2009 | Kulkarni | |
| 2009/0307249 A1 | 12/2009 | Koifman | |
| 2010/0161941 A1 | 6/2010 | Vyshetsky | |
| 2010/0211815 A1 | 8/2010 | Mankovskii | |
| 2010/0274984 A1 | 10/2010 | Inomata | |
| 2010/0299309 A1 | 11/2010 | Maki | |
| 2010/0306495 A1 | 12/2010 | Kumano | |
| 2010/0332730 A1 | 12/2010 | Royer | |
| 2011/0083126 A1 | 4/2011 | Bhakta | |
| 2011/0188506 A1 | 8/2011 | Arribas | |
| 2011/0208928 A1 | 8/2011 | Chandra | |
| 2011/0246420 A1 | 10/2011 | Wang | |
| 2011/0276951 A1 | 11/2011 | Jain | |
| 2012/0066449 A1 | 3/2012 | Colgrove | |
| 2012/0102369 A1 | 4/2012 | Hiltunen | |
| 2012/0216052 A1 | 8/2012 | Dunn | |
| 2012/0226667 A1 | 9/2012 | Volvovski | |
| 2012/0240012 A1 | 9/2012 | Weathers | |
| 2012/0265976 A1 | 10/2012 | Spiers | |
| 2012/0311671 A1 | 12/2012 | Wood | |
| 2012/0331113 A1 | 12/2012 | Jain | |
| 2013/0054932 A1 | 2/2013 | Acharya | |
| 2013/0339659 A1 | 12/2013 | Bybell | |
| 2013/0346709 A1 | 12/2013 | Wang | |
| 2014/0006465 A1 | 1/2014 | Davis | |
| 2014/0047263 A1 | 2/2014 | Coatney | |
| 2014/0047341 A1 | 2/2014 | Breternitz | |
| 2014/0047342 A1 | 2/2014 | Breternitz | |
| 2014/0058871 A1 | 2/2014 | Marr | |
| 2014/0059527 A1 | 2/2014 | Gagliardi | |
| 2014/0059528 A1 | 2/2014 | Gagliardi | |
| 2015/0046644 A1 | 2/2015 | Karp | |
| 2015/0067031 A1 | 3/2015 | Acharya | |
| 2015/0074358 A1 * | 3/2015 | Flinsbaugh | G06F 3/06 711/155 |
| 2015/0112951 A1 | 4/2015 | Narayanamurthy et al. | |
| 2015/0134857 A1 | 5/2015 | Hahn | |
| 2015/0186217 A1 | 7/2015 | Eslami | |
| 2015/0326481 A1 | 11/2015 | Rector | |
| 2015/0379287 A1 | 12/2015 | Mathur | |
| 2016/0042005 A1 | 2/2016 | Liu | |
| 2016/0124775 A1 | 5/2016 | Ashtiani | |
| 2016/0197995 A1 | 7/2016 | Lu | |
| 2016/0259597 A1 | 9/2016 | Worley | |
| 2016/0283261 A1 | 9/2016 | Nakatsu | |
| 2016/0357456 A1 | 12/2016 | Iwasaki | |
| 2016/0357548 A1 | 12/2016 | Stanton | |
| 2017/0060975 A1 | 3/2017 | Akyureklier | |
| 2017/0149843 A1 | 5/2017 | Amulothu | |
| 2017/0168903 A1 | 6/2017 | Dornemann | |
| 2017/0242719 A1 | 8/2017 | Tsirkin | |
| 2017/0244557 A1 | 8/2017 | Riel | |
| 2017/0244787 A1 | 8/2017 | Rangasamy | |
| 2017/0322954 A1 | 11/2017 | Horowitz | |
| 2017/0337492 A1 | 11/2017 | Chen | |
| 2017/0371551 A1 | 12/2017 | Sachdev | |
| 2018/0024889 A1 | 1/2018 | Verma | |
| 2018/0046553 A1 | 2/2018 | Okamoto | |
| 2018/0082053 A1 | 3/2018 | Brown | |
| 2018/0107419 A1 | 4/2018 | Sachdev | |
| 2018/0113625 A1 | 4/2018 | Sancheti | |
| 2018/0113770 A1 | 4/2018 | Hasanov | |
| 2018/0137306 A1 | 5/2018 | Brady | |
| 2018/0159745 A1 | 6/2018 | Byers | |
| 2018/0165170 A1 | 6/2018 | Hegdal | |
| 2018/0218000 A1 | 8/2018 | Setty | |
| 2018/0246745 A1 | 8/2018 | Aronovich | |
| 2018/0247064 A1 | 8/2018 | Aronovich | |
| 2018/0285353 A1 | 10/2018 | Ramohalli | |
| 2018/0329981 A1 | 11/2018 | Gupte | |
| 2018/0364917 A1 | 12/2018 | Ki | |
| 2019/0065061 A1 | 2/2019 | Kim | |
| 2019/0073132 A1 | 3/2019 | Zhou | |
| 2019/0079928 A1 | 3/2019 | Kumar | |
| 2019/0089651 A1 | 3/2019 | Pignatari | |
| 2019/0156023 A1 | 5/2019 | Gerebe | |
| 2019/0188094 A1 | 6/2019 | Ramamoorthi | |
| 2019/0190803 A1 | 6/2019 | Joshi | |
| 2019/0215313 A1 | 7/2019 | Doshi | |

OTHER PUBLICATIONS

Fast and Secure Append-Only storage with Infinite Capacity, Zheng.
User Mode and Kernel Mode, Microsoft.
Implementing time critical functionalities with a distributed adaptive container architecture, Stankovski.
Precise memory leak detection for java software using container profiling, Xu.
Mogi et al., "Dynamic Parity Stripe Reorganizations for RAID5 Disk Arrays," 1994, IEEE, pp. 17-26.

(56) References Cited

OTHER PUBLICATIONS

Syed et al, "The Container Manager Pattern", ACM, pp. 1-9 (Year 2017).
Rehmann et al., "Performance of Containerized Database Management Systems", ACM, pp. 1-6 (Year 2018).
Awada et al, " Improving Resource Efficiency of Container-instance Clusters on Clouds", IEEE, pp. 929-934 (Year 2017).
Stankovski et al, "Implementing Time- Critical Functionalities with a Distributed Adaptive Container Architecture", ACM, pp. 1-5 (Year 2016).
Dhakate et al, "Distributed Cloud Monitoring Using Docker as Next Generation Container Virtualization Technology" IEEE, pp. 1-5 (Year 2015).

\* cited by examiner

US 10,534,549 B2

MAINTAINING CONSISTENCY AMONG COPIES OF A LOGICAL STORAGE VOLUME IN A DISTRIBUTED STORAGE SYSTEM

RELATED APPLICATIONS

This application is related to U.S. application Ser. No. 15/709,269 filed Sep. 19, 2017, which is incorporated herein by reference for all purposes.

BACKGROUND

Field of the Invention

This invention relates to storing and retrieving information in a distributed storage system.

Background of the Invention

In a distributed storage system, a primary copy of a storage volume, or a portion thereof, is stored on a storage node. Clone copies of the storage volume, or portions of clone copies, are stored on other storage nodes. In order to function effectively, updates to the primary copy must be performed on the clone copies. In the case of a failure of a node, a current clone or primary copy may be used to create another clone copy.

The system and methods disclosed herein provide an improved approach for implementing a distributed storage system.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
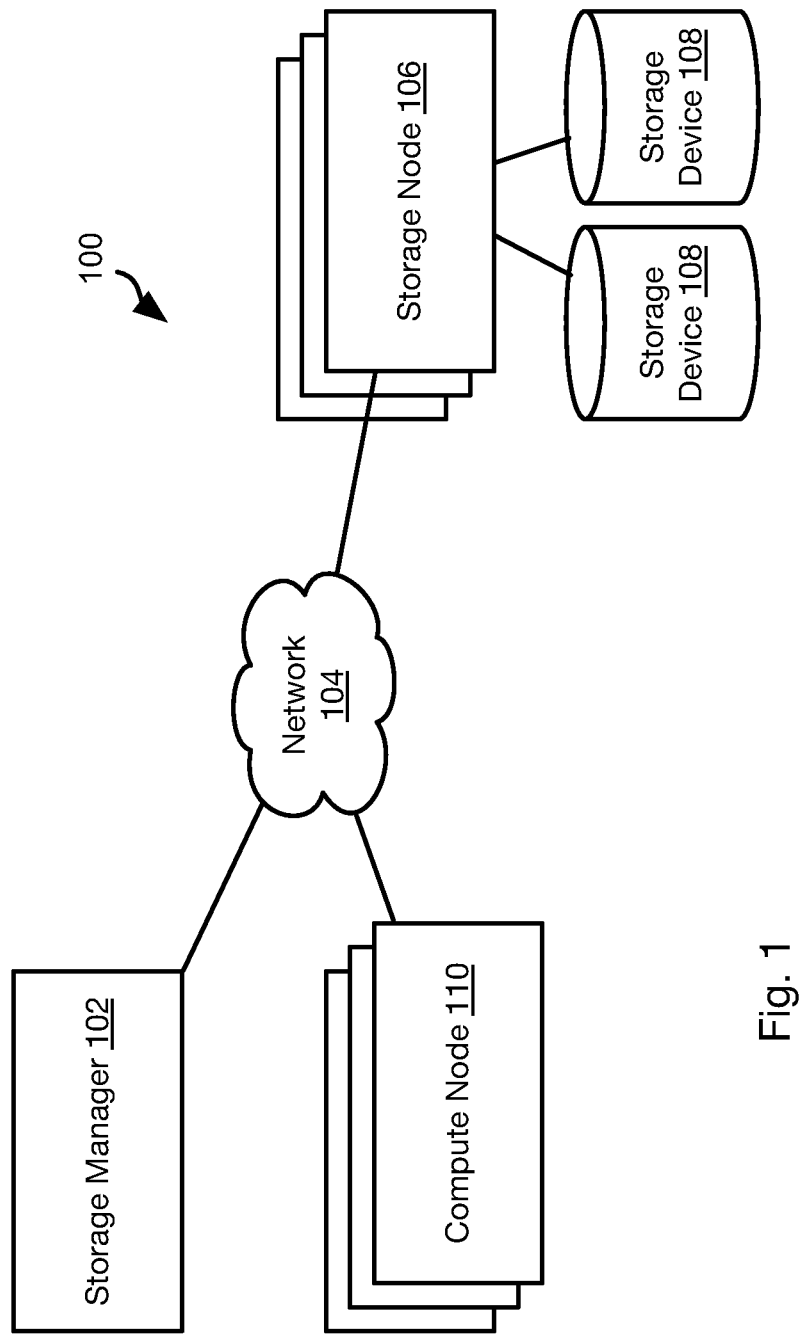
FIG. 1 is a schematic block diagram of a distributed storage system for implementing methods in accordance with an embodiment of the present invention.

Referring to FIG. 1, the methods disclosed herein may be performed using the illustrated distributed storage system 100. The distributed storage system 100 includes a storage manager 102 that coordinates the storage of data corresponding to one or more logical storage volumes. In particular, the storage manager 102 may be connected by way of a network 104 to the one or more storage nodes 106, each storage node having one or more storage devices 108, e.g. hard disk drives, flash memory, or other persistent or transitory memory. The network 104 may be a local area network (LAN), wide area network (WAN), or any other type of network including wired, fireless, fiber optic, or any other type of network connections.

One or more compute nodes 110 are also coupled to the network 104 and host user applications that generate read and write requests with respect to storage volumes managed by the storage manager 102 and stored within the memory devices 108 of the storage nodes 108.

The methods disclosed herein ascribe certain functions to the storage manager 102, storage nodes 106, and compute node 110. The methods disclosed herein are particularly useful for large scale deployment including large amounts of data distributed over many storage nodes 106 and accessed by many compute nodes 110. However, the methods disclosed herein may also be implemented using a single computer implementing the functions ascribed herein to some or all of the storage manager 102, storage nodes 106, and compute node 110.

Figure 2:
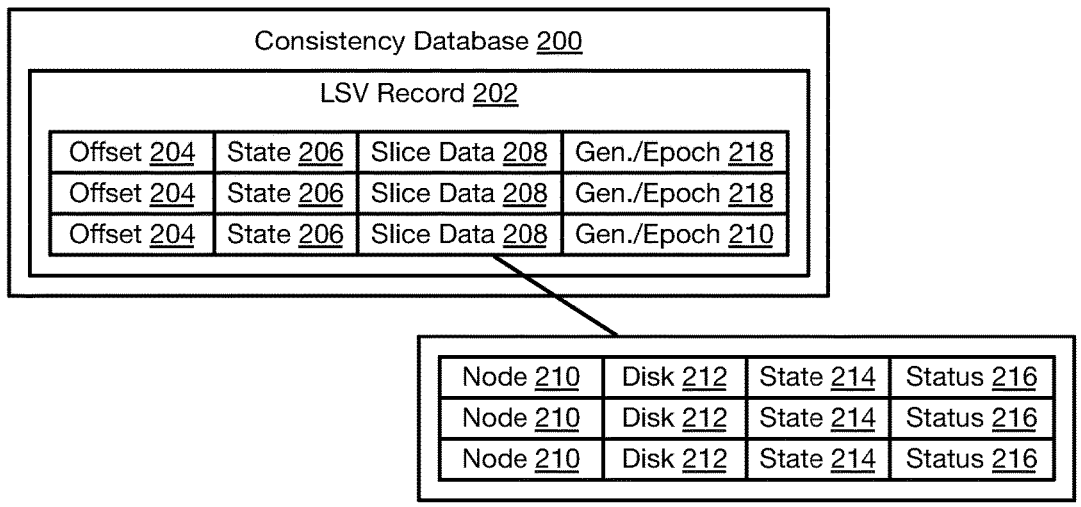
FIG. 2 is a schematic diagram of a consistency database in accordance with an embodiment of the present invention.

Referring to FIG. 2, a consistency database 200 may be hosted and maintained by the storage manager 102 or some other computer system. As described below, the consistency database 200 is important for restoring lost copies of logical storage volumes (LSV) and therefore copies of the consistency database 200 may be maintained on multiple devices and maintained current in order to provide redundancy.

The consistency database may store LSV records 202 for each logical storage volume stored in the distributed storage system 100. Each LSV record 202 may store records including an offset 204 of each slice in the logical storage volume, a state 206 of that slice, and slice data 208 for that slice. The state 206 may indicate whether that slice is current, corrupted, and/or accessible.

A logical storage volume of 1 terabyte (TB) may be divided into slices of 1, 2, 4, 10, or some other number of gigabytes (GB). For purposes of this disclosure a copy of a slice is a storage unit of data that is assigned as a unit to an individual storage node 106 and possibly to an individual storage device 108 of an individual storage node 106.

Slice data 208 may indicate information for each slice each logical storage volume. For example, a logical storage volume of 1 terabyte (TB) may be divided into slices of 1, 2, 4, 10, or some other number of gigabytes (GB). For purposes of this disclosure a copy of a slice is a storage unit of data that is assigned as a unit to an individual storage node 106 and possibly to an individual storage device 108 of an individual storage node 106.

The slice data 208 for a slice may include records for each copy of the slice that include an identifier 210 of a storage node 106 on which the copy of the slice is stored; a disk identifier 212 that identifies a specific storage device 108 in which the copy of the slice is stored; a state 214 of the copy of the slice; and a status for the copy of the slice. The state field 214 may indicate whether the copy is a leader or clone copy of the slice. The status field 216 can refer to the health of the copy of the slice, such as whether the copy of the slice is accessible (e.g., the node 106 hosting it is operation), current, stale (has not acknowledged one or more updates), corrupted, or other information relevant to the status of the copy of the slice.

The LSV record 202 may further include generation data 218 for each slice that is incremented each time the leader storage node 106 for that slice is changed. An epoch field may also be included that is incremented each time the leader node 106 is restarted.

As discussed below the, slice data 208 may be updated and requested by storage nodes 106 and compute nodes 110 such that the consistency database 200 is current and accurately reflects the status of each copy of each slice of a logical storage volume.

Figure 3:
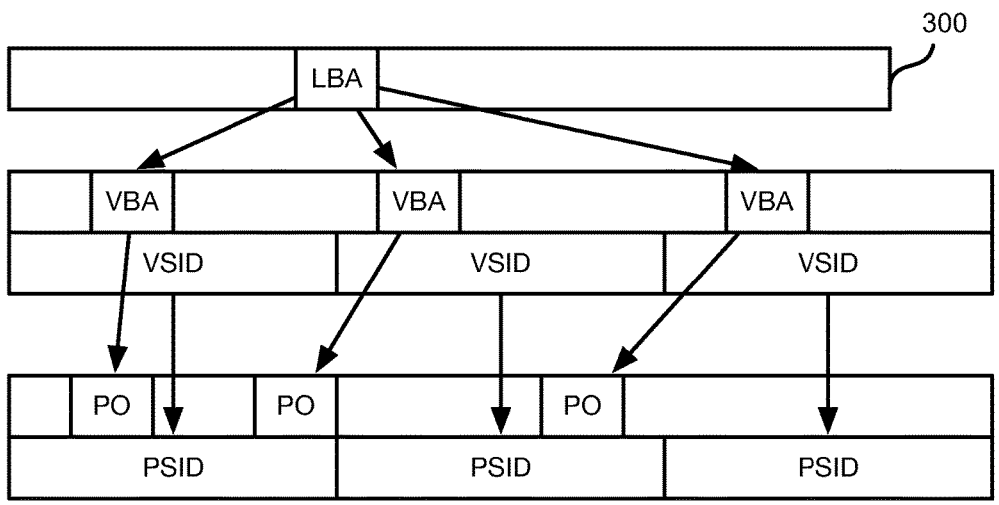
FIG. 3 is a schematic diagram illustrating virtual block addresses (VBA) and virtual segment identifiers (VSID) in accordance with an embodiment of the present invention.

Referring to FIG. 3, as described in greater detail below, each slice 300 may include a plurality of blocks of data each referenced by a logical block address (LBA). The blocks may have any size, such as 1, 2, 4, or some other number of kilobytes (KB).

Each time an LBA of the slice is written to, that write operation is assigned virtual block address (VBA). The VBAs are assigned to each write operation for the slice in a monotonically increasing order, thereby simulating an infinite disk. In practice, the number of bits used to represent the VBA is finite. However, for most applications, VBAs may be assigned according to monotonically increasing order for a large portion of the operation of a storage node for a particular slice 300. Upon reaching the limit of the bits used to represent the VBA, the VBAs may restart from 0 and continue increasing monotonically.

VBAs may be associated with virtual segment identifiers (VSID) that also increase monotonically to simulate an infinite disk within the limits of the bits used to represent the VSID. Each VSID may represent a number of VBAs having a cumulative size of multiple megabytes (MB). For example, in one implementation, each VSID represents VBAs such that the blocks represented by the VBAs of each VSID total 32 MB of storage space.

Data written to each VBA is written at a given physical offset (PO) within a physical segment of a storage device 108 represented by a physical segment identifier (PSID). A PSID may be allocated to a particular slice 300 and mapped to a VSID. Data written to the VBAs of the VSID may therefore be written to the physical segment referenced by that PSID.

Figure 4:
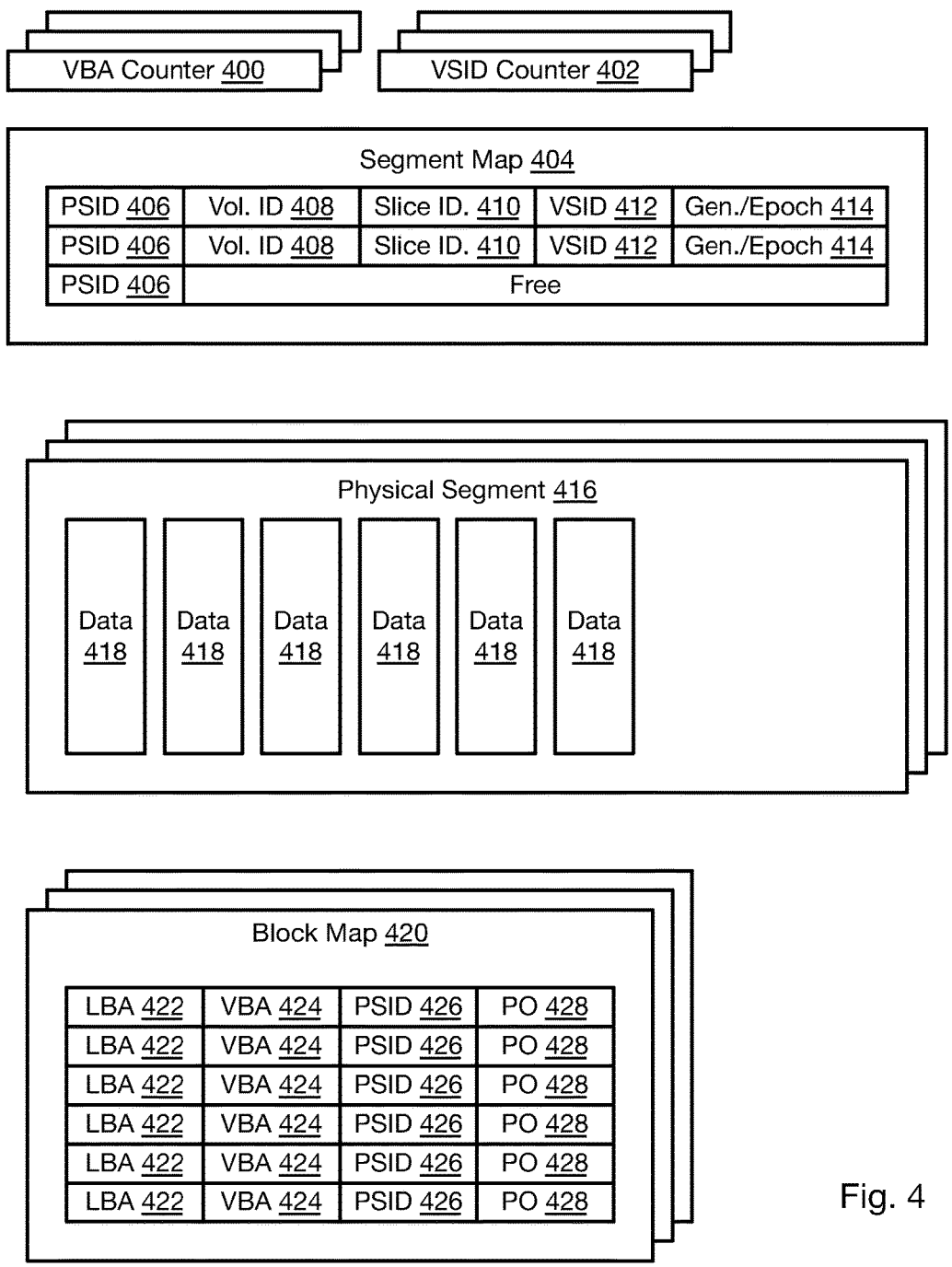
FIG. 4 is a schematic diagram illustrating a storage scheme based on VBAs and VSIDs in accordance with an embodiment of the present invention.

FIG. 4 illustrates an example of how data may be stored and represented in a storage node 106. Each slice 300 may have a corresponding VBA counter 400. For each write operation, the value of the VBA counter 400 is read to obtain a VBA for the block written by the write operation. The VBA counter 400 is also incremented for each write operation, such as after its value is read to obtain the VBA for the each write operation.

In a similar manner, each slice 300 may have a corresponding VSID counter 402. For each segment allocated to the slice 300, the value of the VSID counter 402 is read to obtain a VSID for the newly-allocated segment. The VSID counter 402 is also incremented for segment allocated, such as after its value is read to obtain the VSID for the newly-allocated segment.

A segment map 404 may include entries mapping each PSID 406 of a storage device 108 to the logical storage volume identifier 408, slice identifier 410, and VSID 412 to which that PSID 406 has been allocated. The logical storage volume identifier 408 refers to the logical storage volume, and possibly the copy of that logical storage volume, that a slice belongs to. The slice identifier 410 may be the offset within the logical storage that is the start address of that slice. The segment map may also store the current generation 414 and possibly epoch for the slice ID 410 (see definition of field 218 in FIG. 2, above). The VBA at the first position for the PSID 406 may be derived from the VSID 412, e.g. N*VSID−1, where N is the number of blocks in each segment.

Each PSID 406 corresponds to a physical segment 416 within a storage device 108. In some embodiments, the segment map 404 is an area of memory of the storage device such that the PSID 406 is not stored in the record 404. Instead, the location to which the entry in the segment map is written indicates the PSID 406 that the entry corresponds to. Data blocks 418 corresponding to each VBA are then written to the physical segment 416.

The entry for PSIDs 406 that are not currently allocated to a slice may be empty or otherwise flagged as free in the segment map 404.

In some embodiments, each copy of a slice 300 stored on a storage node 106 may have a corresponding block map 420 stored by the storage node 106. The block map 420 may indicate, for each LBA 422 in the slice, the VBA 424 that was last assigned to that LBA 422. In some embodiments, the block 420 may further indicate the PSID 426 of the physical segment 416 to which the data corresponding to the VBA 424 was written and possibly a physical offset 428 to which data for that LBA 422 was written in the physical segment 416. Note that where the VSID and VBAs are assigned according to a predictable manner, i.e. all VBAs are allocated in order to a last-allocated VSID until it is full, then the VBA 424 alone may be used to determine the VSID (e.g., Int((VBA+1)/N), where N is the number of blocks in each segment). The PSID 426 mapped to that VSID may then be determined from the segment map 404. Likewise, the physical offset (measured in blocks) may be obtained as (VBA+1) % N, where A % B is the modulus operator and returns the remainder of A/B.

The block map 420 may be updated by the storage node 106 for each write operation. Accordingly, the block map 420 indicates where the latest and valid copy of data for a given LBA 422 is stored. All other VBAs representing that LBA correspond to invalid or stale data.

Read requests may be processed in a straight forward manner, the storage node 106 storing a leader copy of a slice is identified by a compute node 110 from the consistency database. The compute node 110 then transmits the read request to that storage node 106. The LBA 422 from the read request is evaluated with respect to the block map 420 to identify the PSID 426 for that LBA 422. The requested data 418 is read from the physical offset 428 for the LBA 422 in the physical segment 416 corresponding to the PSID 426, either using the PO 428 in the block map 420 or an offset derived from the VBA 424. The read data is then returned to the compute node 110.

Figure 5:
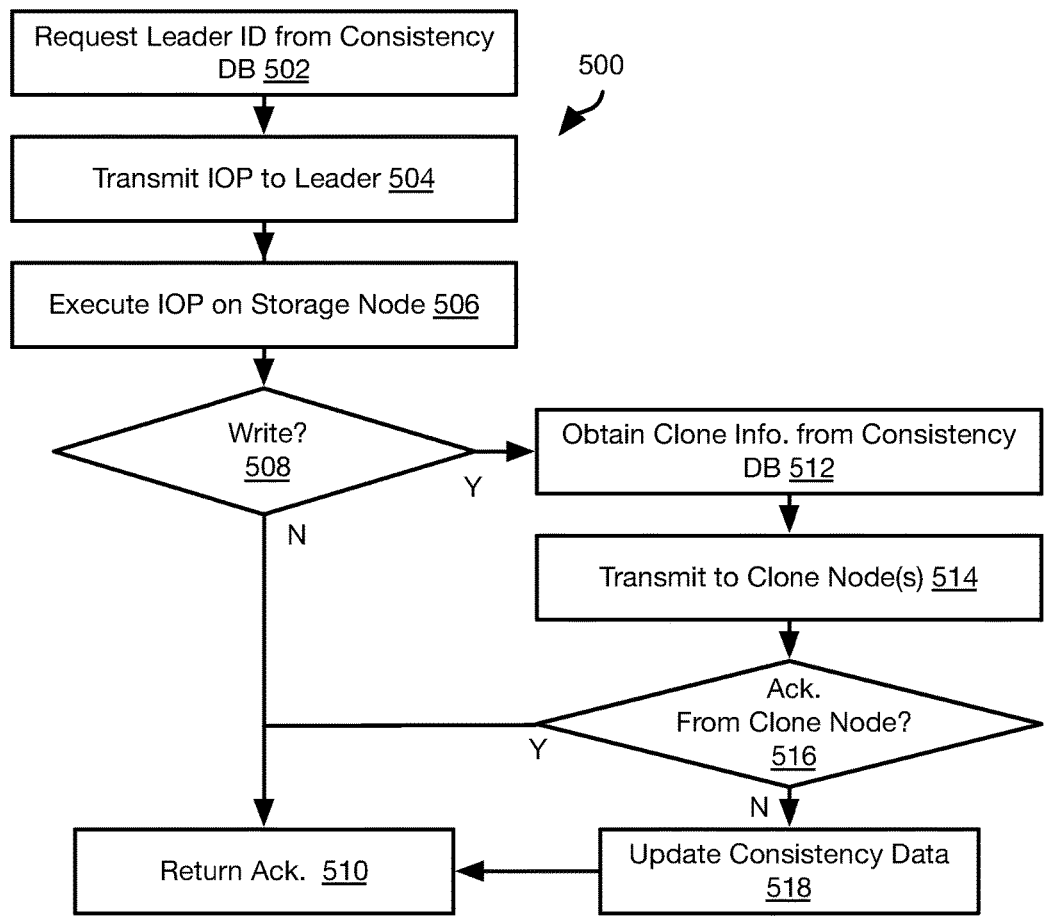
FIG. 5 is a process flow diagram of a method for coordinating write operations with a consistency database in accordance with an embodiment of the present invention.

FIG. 5 illustrates a method 500 for updating and using the consistency database 200 during an input/output operation (IOP). The method 500 may include a compute node 110 with a pending IOP for a logical storage volume ("the subject volume") requesting 502 an identifier of the leader for the subject volume from the consistency database 200. In particular, for the slice of the logical storage volume referenced by the IOP ("the subject slice"), the compute node may request the identity of the storage node 106 storing the leader copy of that slice of the logical storage node ("the leader node"). The host then returns an identifier 210 of the leader node and possibly the disk 212 corresponding to the leader copy of the subject slice of the subject volume.

In some embodiments, the compute node 110 caches the leader information returned from the consistency database 200 for the subject slice so as to not repeat the lookup for every IOP to the subject slice. Alternatively, when the subject volume is mounted on the compute node 110, the compute node can fetch the leader information for all the slices in the subject from the consistency database prior to generating and transmitting any IOPs for the subject volume.

In other embodiments, the compute node 110 may simply have an address within the logical storage volume and transmit this address and an identifier of the logical storage volume to the host of the consistency database. The host then determines the subject slice corresponding to that address, e.g., based on the offsets 204 of the slices, and returns the subject node and possibly the disk 212 storing the leader copy of that slice of the subject volume.

The compute node then transmits 504 the IOP to the leader node. The leader node then executes 506 the IOP. If the IOP is not found 508 to be a write request, then a result of the IOP is returned 510 by the leader node along with an acknowledgment of success, e.g. payload data referenced by the IOP. An example of how a read request may be processed is described above with respect to FIG. 4.

If the IOP is found to be a write request, a storage node 106 ("clone node") storing a clone copy of the slice referenced by the IOP may be obtained by the leader node from the consistency database 200. In some embodiments, the identity of the clone node for the subject slice is cached and will therefore not need to be looked up for subsequent IOPs. The write request is then transmitted 514 to the clone node. If an acknowledgment of successful execution of the write request is found 516 to have been received by the leader node from the clone node, then the leader node returns 510 an acknowledgment of execution of the write operation. Note that execution of the write IOP on the storage node 506 may be performed in parallel with execution of the IOP on the clone node. Accordingly, some or all of steps 512-518 may be performed in parallel with step 506.

If an acknowledgment of successful completion is not found 516 to have been received, the leader node may update 518 the consistency database 200 to indicate a problem for the clone node. For example, where no response is received within a configurable timeout interval, the leader node may instruct the consistency database 200 to indicate that the clone node is also no longer accessible. Where a response indicating failure is received, the leader node may instruct the consistency database 200 to indicate that the clone node is not current. After confirmation of completion of the update to the consistency database 200 is received, the storage node 106 may then return 510 acknowledgment to the compute node 110. In some embodiments, the leader node will retry performing the update 518 until it is successful and refrain from acknowledging completion until confirmation of the update 518 is received.

In many instances, multiple clones of a logical storage volume may exist, according steps 512-516 may be repeated for each of these clones. Accordingly, for each clone node that does not acknowledge successful execution of the IOP, the consistency database may be updated 518.

In some embodiments, only if all clone nodes acknowledge completion will the leader node return acknowledgment. In others, only one or some other minimum number must be found 516 to have return acknowledgment of successful completion of the write command before acknowledgment will be returned 510 to the compute node 110.

Note that if any failures or problems detected by a compute node 110, the leader node or clone node may be reported to the consistency database 200. For example, if a storage device 108 fails or is corrupted, the slice data 208 for slices on that device may be updated to indicate this fact. If a storage node 106 detects that it has been restarted it may report this fact and slice data 208 for slices stored on that storage node 106 will be updated to indicate that the slices are likely stale. Where compute node 110 does not receive a response from the leader node, the status 216 of slices stored on the leader node may be updated to indicate that the slices are not accessible.

Figure 6:
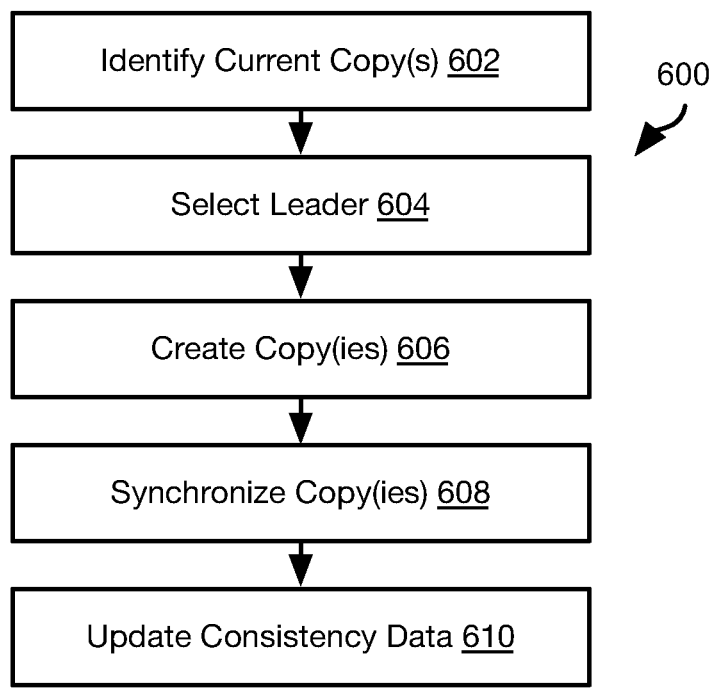
FIG. 6 is a process flow diagram of a method for restoring a copy of storage volume using a consistency database in accordance with an embodiment of the present invention.

Referring to FIG. 6, the illustrated method 600 may be executed in the distributed storage system 100 using the consistency database. The method 600 may be executed in response to events reported to the storage manager 102 or some other computing device that hosts the consistency database 200. Events may include detecting failure of a storage node, detecting corruption or loss of a slice of a copy of a logical storage volume, or some other event. In either case one or more slices of one or more logical storage volumes may be affected by the failure. The method 600 may be executed with respect to each logical storage volume that is affected ("the subject volume"). In some embodiments, the method 600 is executed separately with respect to each slice of each the subject volume that is affected ("the subject slice").

The method 600 may include identifying 602 current copies of the subject slice in the consistency database 200. This may include evaluating the status 216 of the copies of the subject slice in the slice data 208 of the subject slice.

The method 600 may include selecting 604 a leader node for the subject slice. Where the leader node for the subject slice is listed as being current and available in the slice data 208 for the leader copy of the subject volume, step 604 may be omitted. If the leader node for the subject slice is listed as not current or not available, another copy of the subject slice on a clone node may be selected 604 and that clone node will become the leader node for the subject slice. The slice data for that copy will then be updated to indicate in its state 214 that it is now the leader copy. The generation data 218 for the subject slice may also be incremented.

Where at least one copy of the subject slice is not accessible or current, one or more copies of the subject slice may be created 606. Specifically, a storage node 106 and possibly a specific storage device 108 of the storage node may be selected. One of the current copies of the subject slice identified at step 602 may then be copied to the storage node 106.

The method 600 may further include synchronizing 608 one or more copies of the subject slice. In particular, those copies of slices that are not listed as current in the slice data 208 of the subject volume may be synchronized with a current copy of the subject slice identified at step 602. One example of an approach for synchronization is described below with respect to FIG. 11.

The method 600 may further include updating 610 the consistency database 200 according to actions taken according to the preceding steps of the method 600. In particular, where a new leader is selected for the subject slice 604, this is noted in the slice data 208 for the subject slice. Where a new copy of the subject slice is created, the slice data 208 of the subject volume may then be updated in the consistency database 200 to include the identity (offset) of the subject slice, the selected storage node 106, the specific storage device where the new copy is stored, and the status of the new copy of the subject slice (current and available). Where copies are synchronized at step 608, the status of the copies of the subject slice may be updated in the slice data 208 to indicate that they are now current.

Figure 7:
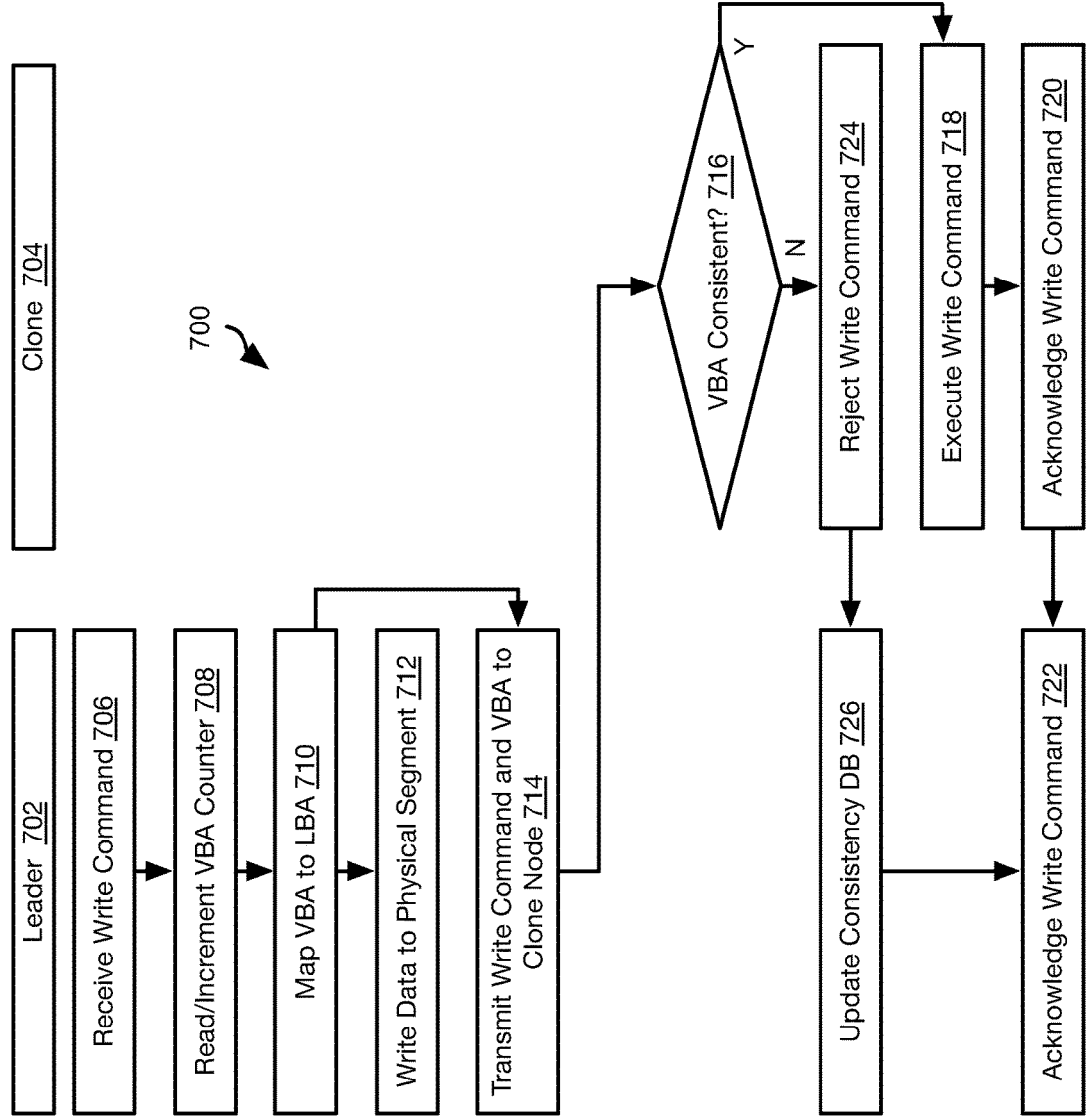
FIG. 7 is a process flow diagram of a method for processing write commands on a clone node in accordance with an embodiment of the present invention.

FIG. 7 illustrates a method 700 by which a leader node 702 and a clone node 704 for a particular slice ("the subject slice") of a particular logical storage volume ("the subject volume") may detect if a copy of the subject slice on the clone node is stale.

The method 700 includes receiving 706 a write command, such as from a compute node 110 that references the subject volume and the subject slice. The leader node 702 then executes the write command as outlined above. Specifically, the leader node 702 read and increments 708 the VBA counter 400 for the subject slice. As noted above, the order of reading and incrementing may be reversed depending on the convention selected by an operator.

The LBA referenced in the write command is then mapped 710 to the VBA read at step 708, such as in the block map 420. The data from the write command is then written 712 to the physical segment corresponding to the VBA read at step 708. An example of how this physical segment is allocated is described below with respect to FIG. 8.

The method 700 may also transmit 714 the VBA of step 708 and the write command to the clone node 704. Step 716 and possibly one or more subsequent steps may be performed in parallel with step 712. The clone node 704 evaluates 716 whether the VBA is consistent. In particular, if a difference between the VBA and the VBA of a last-received VBA is more than one, then this indicates that one write command was missed by the clone node and therefore the clone node 704 is no longer current. In some embodiments, the clone node 704 may maintain its own VBA counter 400 that is updated for each write command received. Accordingly, if the VBA from step 708 is not the same as the value of the VBA counter 400 after incrementing for the write command transmitted at step 714, then the VBA may be determined 716 to be inconsistent.

Note that this consistency check may assume a particular ordering of writes between the leader node 702 and the clone nodes 704, i.e. when multiple writes are outstanding between the leader node 702 and the clone node 704, the clone node 704 may be constrained to receive writes in the same order that the leader node 702 sent them. This can be enforced for example by using a single TCP socket between the leader node 702 and the clone node 704. The clone node 704 then serially drains the socket using a single thread.

Note that the disk writes on the clone node 702 may or may happen in the order received, just the consistency check for the writes is performed serially in the order received. The actual execution of write IOPs and sending the acknowledgements can happen in parallel in any order for multiple concurrent writes.

In which ever manner it is implemented, if the VBA is determined 716 to be consistent, then the clone node 704 executes 718 the write command. The clone node 704 may execute the write command in the same manner as the leader node (steps 706-712).

After executing 718 the write command, the clone node 704 acknowledges 720 successful completion to the leader node 702. The leader node 702 then acknowledges 722 completion of the write command to the source of the write command at step 706 after all, or a minimum required number, of clone nodes 704 acknowledge completion of the write command. As described above with respect to FIG. 5, if one or more clone nodes do not acknowledge completion of the write command, the consistency database 200 may be updated accordingly.

If the VBA transmitted at step 714 is determined 716 not to be consistent, the clone node 704 rejects 724 the write command and notifies the leader node 702 and/or the storage manager 702 or other computing devices that hosts the consistency database 200. The storage manager 702 or leader node 702 then invokes updating 726 of the consistency database. In some embodiments, the leader 702 may also acknowledge 722 completion of the write command. In response to the rejecting 724 and updating 726 of the consistency database 200, synchronizing of the copy of the subject slice on the clone node 704 may be performed (see description of FIG. 6, above, and FIG. 11, below).

Figure 8:
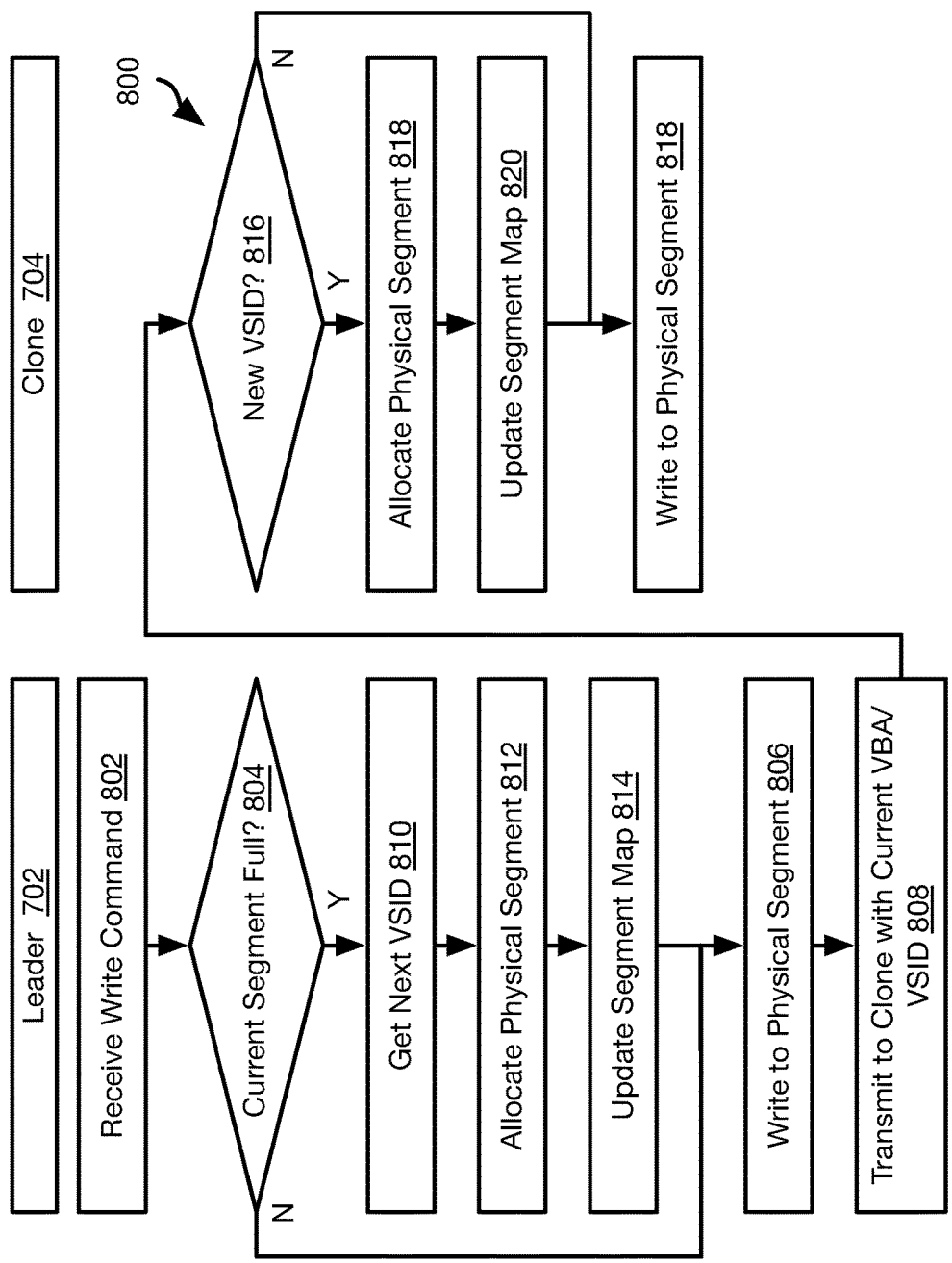
FIG. 8 is a process flow diagram of a method for performing allocating segments of physical storage in accordance with an embodiment of the present invention.

FIG. 8 illustrates a method 800 by which physical segments 416 of a storage device 108 are allocated by each storage node 106 to a particular copy of a slice of a logical storage volume. The method 800 may be executed for each write command, such as when performing steps 712 and 718 of the method 700.

The method may include receiving 802 a write command and determining which slice ("the subject slice") of which logical storage volume ("the subject volume") is referenced by the write command. As described with respect to the method 700 of FIG. 7, the write command may be assigned a VBA ("the current VBA") based on the state of the VBA counter 400 for the subject slice.

The method 800 may include evaluating 804 the segment map 404. In particular step 804 evaluates whether there is space in the physical segment 416 ("the current segment") for the highest-valued VSID 412 allocated to the slice ID 410 and VSID of the subject slice and subject volume ("the current VSID"). This may include evaluating the VBA 414 of the entry for the PSID 406 of the current segment. If the VBA 414 in the segment map is determined to be the Nth VBA for the current VSID and current segment, where N is the number of blocks per segment, then the current segment may be determined to be full. The current VSID for the subject slice may be determined from the VSID counter 402 for the subject slice or by searching the segment map 404.

In some embodiments, if (VBA+1) % N is zero (% being the modulus operator and VBAs being assigned starting at 0, and VBA is the highest-valued VBA 414 in the segment map 404 corresponding to the subject volume and subject slice), then the corresponding physical segment 416 may be determined to be full. In other instances, the current VBA may be evaluated: if (current VBA+1) % N is 1, then the current segment is determined 804 to be full.

It is not necessary that written data 418 for the VBAs fill up the entire segment 416 mapped to a VSID. For example, each VBA write into the segment 416 for the VSID may write some metadata at the end of the segment 416. The metadata may include the LBA, PO within the segment 416 and other attributes regarding the write such as compression, encryption etc. The writes therefore fill the segment 416 from the beginning and the metadata fills the segment from the end. When there is not enough space between the last PO and the last metadata write for the data from the new write, then the segment 416 is deemed full. For example, a data PO of the first empty space from the beginning and a metadata PO of the first empty space from the end may be maintained in the segment map 404 and updated after each write is executed. Where these POs are equal or separated by less than a threshold amount, the segment 416 may be deemed full. If the metadata is written elsewhere i.e. outside the segment then the VBAs can fill up the entire segment and the (VBA+1) % N check can be used to figure out if the segment is full.

If the current segment is determined 804 not to be full, then the data from the write command of step 802 is written 806 to the current segment at the first free location from a first end of the current segment starting at which data is written. For example, the offset may be equal to (current VBA) % N. Alternatively, the entry for the PSID 406 of the current segment may store the physical offset of last write operation. Accordingly, the physical offset for the current write operation may be determined by incrementing this value.

Alternatively, the segment map 404 can contain the data PO and the metadata PO of the last write to the segment 416 for a particular PSID 406. When the write command of step 802 is executed, the data PO and metadata PO are evaluated to determine whether data from the write command will fit in the segment 416. If so, the data and metadata for the write command are written to the data PO and metadata PO, respectively. The data PO and metadata PO may then be updated in the segment map 404. This update can be made only to the in-memory version of the segment map 404 and not updated on the disk to reduce loading. The highest PO for a segment 416 can be obtained after a node restarts by scanning the metadata contents at the end of the segment 416.

The current VBA and write operation may then be transmitted 808 to one or more clone nodes 704. In some embodiments, the current VSID may also be transmitted at step 808.

If the current segment is determined 804 to be full, then the method 800 may include getting 810 a next value of the VSID for the subject slice. In particular, the value of the VSID counter 402 of the subject slice may be read and incremented (starting at 0), or incremented and read (if starting at 1), depending on the convention implemented by the operator.

A new physical segment is then allocated 812 to the subject slice. In particular, an entry for a PSID 406 that is empty or flagged as free in the segment map 404 may be selected at step 812 ("the selected PSID 406"). The segment map 404 for the selected PSID 406 may then be updated 814 to include the volume identifier 408 and slice identifier from the write command and one or both of the VSID from step 810 in field 412 and the current VBA in field 414.

Steps 806 and 808 may then be executed using the selected PSID 406 as the current segment and the VSID from step 810 as the current VSID.

The clone node 704 may receive the write command transmitted at step 808 and execute it by either (a) performing steps 802-806 in the same manner as for the leader node or (b) performing steps 816-822. In particular, the method 800 may include evaluating 816 whether the VSID transmitted at step 808 is a new VSID, i.e., different from the current value of the VSID counter 402 for the subject slice on the clone node 704 or the highest-valued VSID for the subject slice in the segment map 404 of the clone node 794. If not, then the data from the write command is written 818 to the current segment, i.e. the physical segment 416 referenced by the entry for the PSID 406 including the VSID received in the write command transmitted at step 808. The physical offset within the current segment may be determined as described above with respect to step 806. Stated differently, when a write results in a new PSID and VSID for a slice, i.e. a new segment allocation, then when that write is received by the clone node 704 it should result in the allocation of a new segment 416 on the clone node 704. This is the case where write commands are constrained to be received by the clone node 704 in the order received from the leader node 702 as described above with respect to the method 700 of FIG. 7. A first write to a VSID on the leader node should therefore also be the first write to that VSID on the clone node without additional constraints.

If the VSID transmitted at step 808 is determined 816 to be new, the method 800 may include allocating, by the clone node 704, a new physical segment is allocated 818 as the current segment and the segment map 404 of the clone node is updated 820 (see description of step 812-814, above). Step 818 is then executed with respect to the current segment at step 818. The physical offset within the current segment may be determined as described above with respect to step 806.

Figure 9:
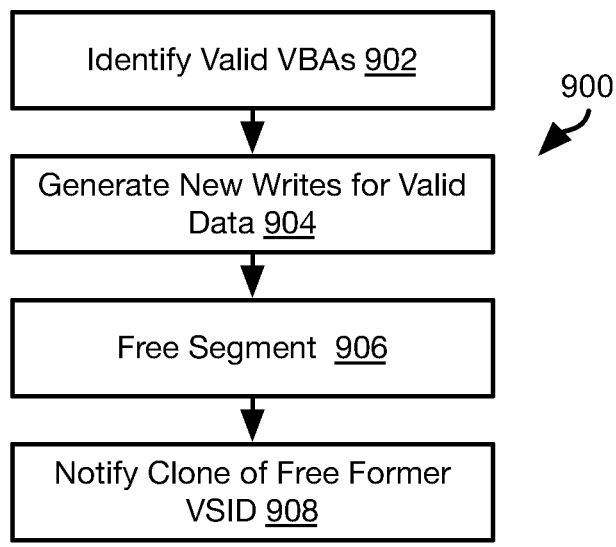
FIG. 9 is a process flow diagram of a method for performing garbage collection in accordance with an embodiment of the present invention.

FIG. 9 illustrates a method 900 for performing garbage collection. The method 900 is executed by the leader node for each slice ("the subject slice") of a logical storage volume ("the subject volume"). As described below, updates according to the garbage collection algorithm are then propagated to clone nodes. Accordingly, in some embodiments, garbage collection is not performed on clone nodes, i.e. clone nodes do not perform the process of identifying invalid data and rewriting valid data to new segments.

The method 900 includes identifying 902 invalid VBAs, i.e., VBAs mapped to an LBA of the subject slice that has been mapped to a higher-valued VBA. For example, each VBA of the subject slice that is not referenced in the block map 420 of the subject slice is invalid and each VBA that is referenced is valid.

In some embodiments, garbage collection is performed for a physical segment 416 only when the amount of valid data in it falls below some percentage, e.g. below a value between 30 and 50, e.g. 40%. Accordingly, if, after performing step 902, the number of valid VBAs mapped to a physical segment 416 is above this percentage, the remainder of the method 900 is not executed.

For each physical segment 416 ("the subject segment") having a below-threshold percentage of valid data, some or all of steps 904-908 may be executed. The method 900 may include generating 904 new write commands for valid data in the subject segment. In particular, for each LBA mapped in the block map to the subject segment, a write command may be issued 904 that includes that LBA and the data stored in the subject segment for that LBA. The write command may be processed in the same manner as for any other write command (see FIGS. 5, 7, and 8). In particular, a new VBA and VSID will be assigned to the write command and the valid data will be written to a different physical segment, such as in the manner described with respect to FIGS. 5, 7, and 8. As described above, this may include transmitting the write commands to clone nodes and verifying their completion. Accordingly, the clone nodes do not need to perform garbage collection but rather only execute write commands, which include those generated as a result of garbage collection.

Note that the data for these write commands generated in the context of the method 900 is located elsewhere on the leader node and clone nodes. Accordingly, write commands of step 904 may differ in that they refer to a location of this data rather than including the data itself, such as by referring to the VBA and VSID to which the valid data was formerly mapped. The valid data may then be copied from the current segment using this information. However, where this approach is used, the current segment may not be reallocated until these write commands are executed, which may or may not be acceptable.

The method 900 may include freeing 906 the current segment after the writes for step 904 are issued, or copying completed where the write commands do not include the valid data. In particular, the entry for the PSID 406 referencing the current segment may be erased or flagged as free in the segment map 404. The leader node may further notify 908 clone nodes for the subject slice that the VSID 412 in the entry for the PSID 406 of the current segment is free. Upon receiving this notification, the clone nodes may update the segment map 404 to flag as free the entry for the PSIDs 406 including the VSID 412. No further action is required by the clone node since the valid data was previously written elsewhere according to the write commands of step 904.

In some embodiments, the clone node will first check the block map 420 for the subject slice. If no LBAs 422 in the block map 420 refer to the PSID 406 mapped to the VSID 412 that was freed, then that PSID is freed. However, in other embodiments, clone nodes do not maintain a block map 420 and read commands are only processed by the leader node. Accordingly, in such embodiments, this check is omitted.

Figure 10:
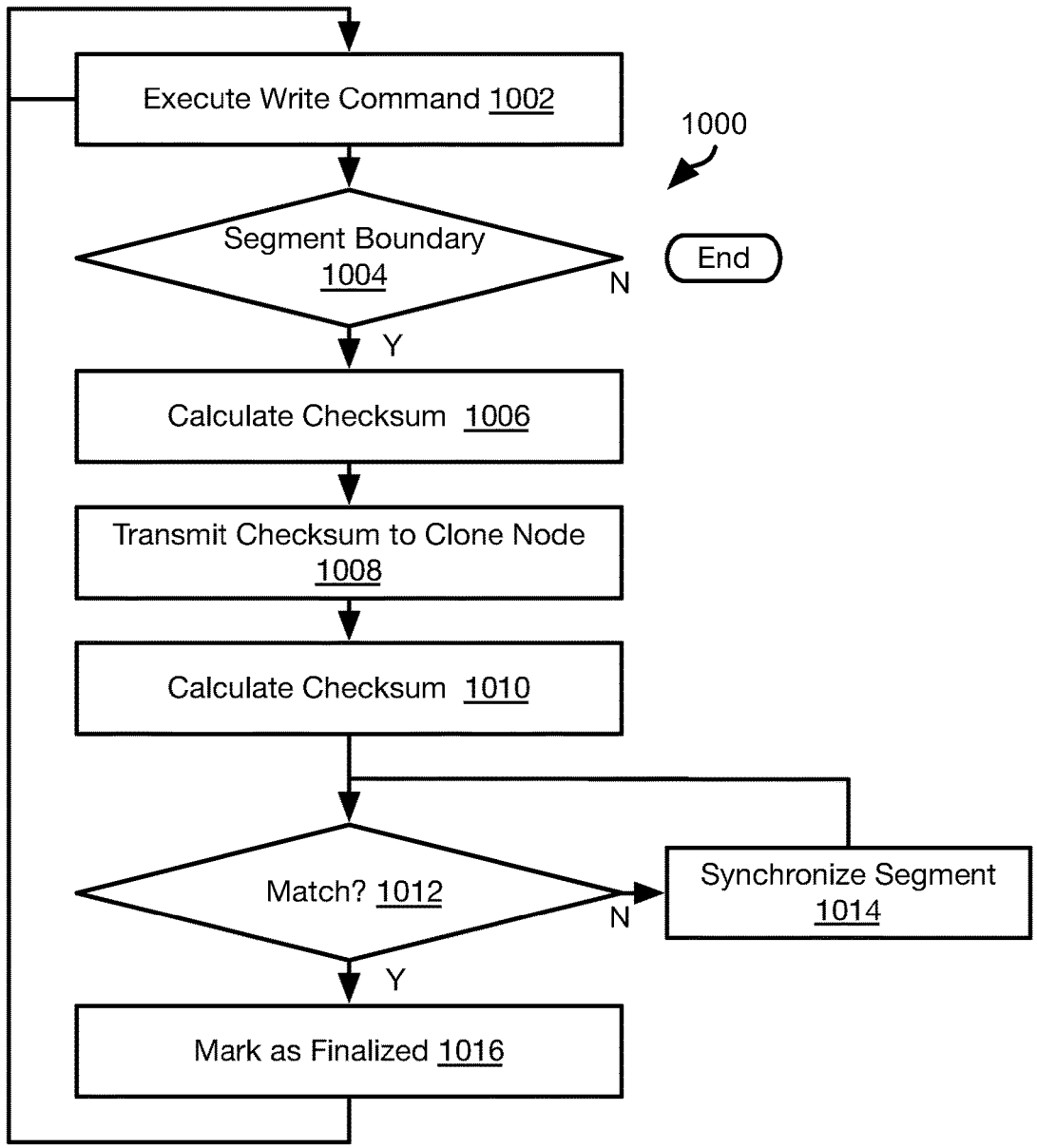
FIG. 10 is a process flow diagram of a method for inline checking of the integrity of segments in accordance with an embodiment of the present invention.

FIG. 10 illustrates a method 1000 may be executed by a leader node and corresponding clone node in order to verify accuracy of data written to physical segments 416 of these nodes.

The leader node executes 1002 a write command, such as according to the approaches described above or using any approach known in the art. If the write command is found 1004 to be at a segment boundary, i.e. occupies the last block of a segment. As noted above, a VBA may be the last VBA in a segment if (VBA+1) % N=0, where N is the number of blocks in a segment and VBAs are generated starting at 0. Accordingly, step 1004 may include evaluating whether the write command executed at step 1002 is mapped to the last VBA in a segment.

If so, then a checksum may be calculated of the segment, i.e., all of the data written to the segment. The checksum may be calculated using any approach known in the art for verifying data integrity and may include one or more bits. For example, longitudinal parity check, modular sum, Fletcher's checksum, Adler-32, cyclic redundancy check, or the like. The result of the checksum may be transmitted 1008 to each clone node. The write command is also transmitted to each clone node either in the same or a different communication according to the other methods for processing write commands as described herein or according to any approach for processing write commands known in the art. Where a write command is not found 1004 to be on a segment boundary, the method 1000 may end.

On the clone node, the checksum is calculated 1010 for the corresponding physical segment. For example, the VSID mapped to the segment evaluated at step 1006 ("the subject VSID") may be transmitted with the checksum. The physical segment of the clone node mapped to this VSID may then be subject to the same checksum algorithm. A checksum from step 1010 may then be compared to the checksum from step 1010. If they match, then the segment on the clone node are finalized 1016. This may include setting a flag in the segment map 404 including the subject VSID indicating that that the segment corresponding to that entry is finalized. The segment corresponding to the subject VSID on the leader node may be finalized after the write command is executed. In other embodiments, the segment corresponding to the subject VSID is finalized only after the checksums are found to match 1012 for all clone nodes.

If the checksums are not found 1012 to match, then the method 1000 may include synchronizing 1014 the segments on the clone node and leader node corresponding to the subject VSID. This may include resending data from the segment corresponding to the subject VSID on the leader node to the clone node either as writes referencing individual LBAs written to the segment or by transmitting the segment as a block write instruction including all data from the segment on the leader node.

In some embodiments, when the condition of step 1004 is met, steps 1006-1016 may be performed separately, i.e. outside of the flow of processing of read and write IOPs. For example, when the condition of step 1004 is met, the segment, e.g. PSID 406, that is determined to be full may be added to a queue. A separate thread may then perform the steps of 1006-1016 for the PSIDs 406 in that queue.

Figure 11:
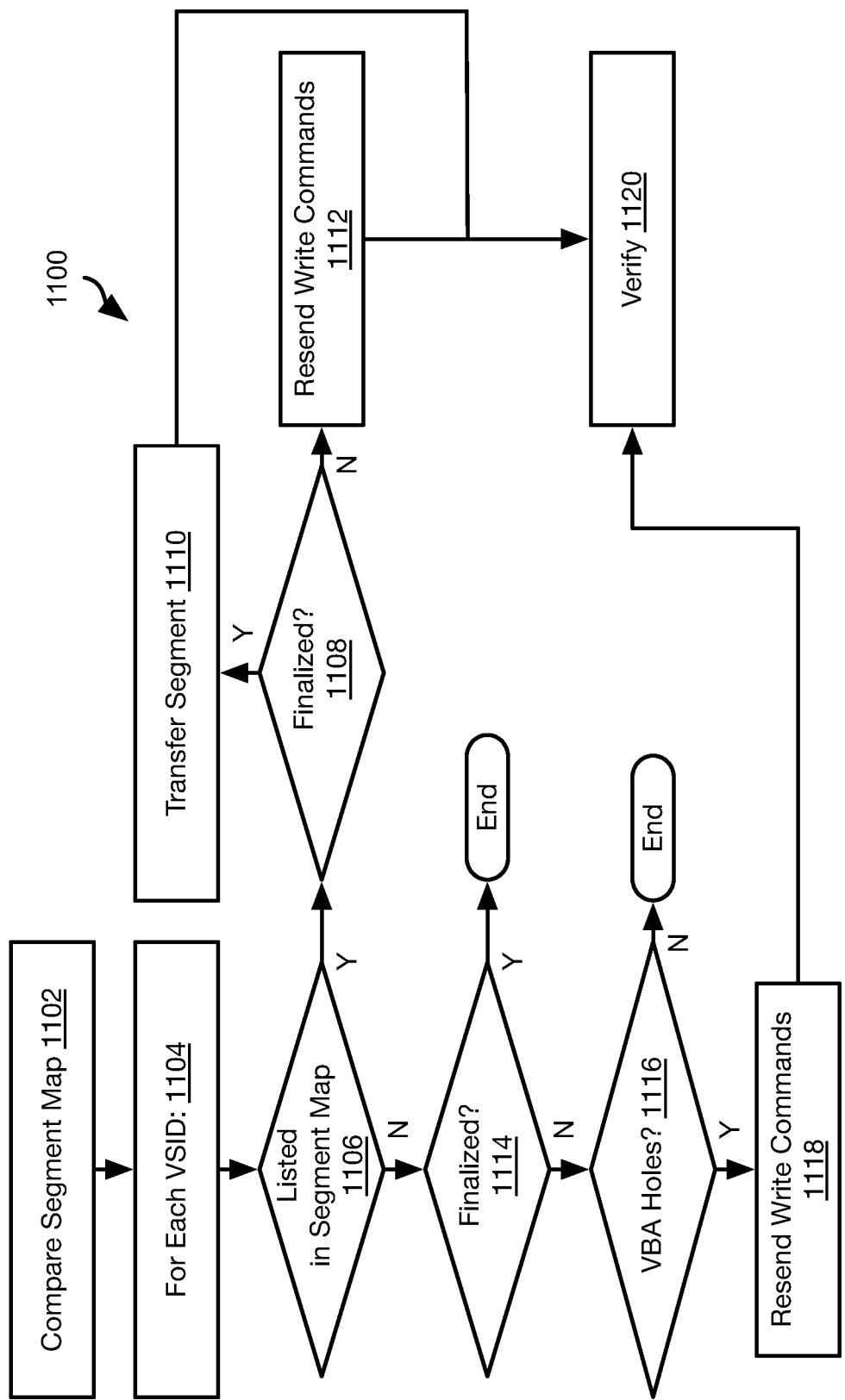
FIG. 11 is a process flow diagram of a method for synchronizing copies of all or part of a logical storage volume in accordance with an embodiment of the present invention.

Referring to FIG. 11, the illustrated method 1100 may be executed by the distributed storage system 100 in order to synchronize a copy of a slice ("the subject slice") of a logical storage volume ("the subject volume") that has been lost, corrupted, or is otherwise no longer current on a first node ("the secondary node") using a current copy of the subject slice on a second node ("the primary node"). In practice, the primary node will often be the leader node for the subject slice. However, the secondary node may also be another clone node that is current in some embodiments and some instances. Accordingly, the method 1100 may be executed in response to detection of any of these conditions, such as according to any of the methods described herein. The method 1100 may be executed on the primary node or secondary node or may be distributed between these devices.

The method 1100 may include comparing 1102 the segment map 404 of a current copy of the slice ("the primary slice") to the segment map 404 of the slice that is to be synchronized or restored ("the secondary slice"). The method 1100 may include looping 1104 through each VSID in the segment map that is mapped to the subject slice and the subject volume ("the current VSID"). The method 1100 includes evaluating 1106 whether the current VSID is also listed in the segment map 404 of the secondary node for the subject slice. In some embodiments, if an entry including a VSID in the segment map 404 of the subject slice on the secondary node has a lower generation number 414 then the entry including that VSID in the segment map 404 of the primary node for the subject slice, then the PSID 406 of that entry is freed on the secondary node without any further consideration. The VSID in that entry will be considered to be absent on the secondary according to the evaluation of step 1106. Similarly, if the generation number 414 is the same but the entry including a VSID on the segment map 404 for the subject slice on the secondary node has a lower epoch number than an entries in the segment map 404 on the primary node including that VSID, then the same process will occur as described above when the generation numbers 414 are different, i.e. free the PSID 406 mapped to that VSID and consider that VSID as absent.

If the VSID is not found in the segment map 404 of the secondary node for the subject slice, the method 1100 may include evaluating 1108 whether the PSID 406 mapped to the current VSID is finalized in the segment map of the primary node. If so, then the data in the physical segment 416 for that PSID 406 is transferred 1110 to the secondary node. This may include transmitting the VSID with the data so that the mapping between the VSID and the data may be maintained as it is on the primary node. Likewise, data describing the VBAs, LBAs mapped to VBAs, and possibly physical offsets within the segment for each LBA may be transmitted such that the block map 420 may be updated on the secondary node for the LBAs written to in the segment.

If the segment is not found 1108 to be finalized, then write commands for LBAs written to for the current VSID are resent 1112. This may include resending the write commands in the order they were received. In particular, the write commands may be transmitted with their corresponding VBAs assigned by the primary node according to the method 700. The secondary node then executes the write commands with respect to a physical segment mapped to the current VSID (see FIGS. 7 and 8).

If the current VSID is found in the segment map 404 of the secondary node for the subject slice, the method 1100 may include evaluating whether the physical segment for the current VSID is finalized on the primary node and secondary node. If so, then the method 1100 may end.

If the current VSID is found in the segment map 404 of the secondary node for the subject slice and is found 1114 not to be finalized on the primary node and secondary node, the method 1100 may include evaluating 1116 whether there are any VBA holes in the physical segment for the current VSID on the secondary node. For example, if the block map 420 of the secondary slice does not list the same VBA for an LBA as the block map 420 of the primary slice, there may be determined 1116 to be an LBA hole. If the VBA counter 400 of the primary node do not match the VBA counter 400 of the secondary node, then a hole may be determined 1116 to be present. If the highest VBA in the block map 420 of the primary node for the subject slice is higher than the highest VBA in the block map 420 for the subject slice, then a hole may be determined to be present. Holes may also be identified by evaluating metadata of writes to segments in the primary node and secondary node. Where a metadata entry is found in the metadata of a segment mapped to a VSID on the primary node but is not in the segment of the secondary node that is mapped to the same VSID, a hole may be determined to be present. As noted above, metadata includes the LBA and PO within a segment for each write. Accordingly, where an LBA and PO pair is absent from a given location in the metadata of the segment of the secondary node, a hole may be determined 116 to be present.

Write commands for the VBA holes identified at step 1116 may then be resent to the secondary node. In particular, the data, LBA, and possibly VSID corresponding to each VBA found to be a hole may be resent 1118.

If a segment 416 for a VSID is found 1114 not to be finalized on both the primary and secondary nodes, then the PO of the segments 416 from the primary and secondary nodes may be compared, where the PO is the data PO (physical offset) described above as the first free location from the beginning of the segment 416. The portion of the segments 416 on the primary and secondary nodes for the same VSID up to the smaller of the two POs should contain the same data. If the PO of the primary is larger, then the data reflecting the difference in the POs between primary and secondary nodes is sent to the secondary as individual writes bringing the secondary segment 416 up to date with the segment 416 of the primary for the same VSID. If the secondary PO is higher, then the primary node may direct the secondary node to discard all the data past the primary PO, thus bringing the primary and secondary segments 416 or the same VSID into agreement.

Once finalized segments have been copied to the secondary node, the segments may be verified 1120, such as according to the method 1000 of FIG. 10. Successful recreation of non-finalized segments may also be verified or may be delayed until these segments are finalized and processed according to the method 1000.

Following execution of the method 1100, the consistency database 200 may also be updated to indicate that the copy of the subject slice is now current and available on the secondary node.

Where the primary node is also the leader node for the subject slice, synchronizing a secondary node that is a clone node, as described in FIG. 11, can be done concurrently with the primary node servicing IOPs from compute nodes 110 for the subject slice. In order to do this, the primary node may pause processing all IOPs for the subject slice for a period during which the leader node will synchronize all the open (non-finalized) segments between the primary and the secondary nodes. After synchronizing the open segments, the primary node then resumes processing the IOPs from the compute nodes 110, including replicating write IOPs to the clone nodes. While this normal replication of write IOPs is happening, the synchronization of the finalized segments between the primary node and the secondary node can happen in the background. Since most of the segments will be final in most applications and only a few segments (most often only one) would be open, the pausing period would be brief and users should therefore not observe much delay. When the synchronization of the finalized segments is complete, all processing of IOPs from the compute nodes 110 for the subject slice may be paused by the primary node while the consistency database 200 is updated to show the secondary node being current. Once the consistency is updated, the primary node may continue processing the IOPs from the compute nodes 110 for the subject slice.

Figure 12:
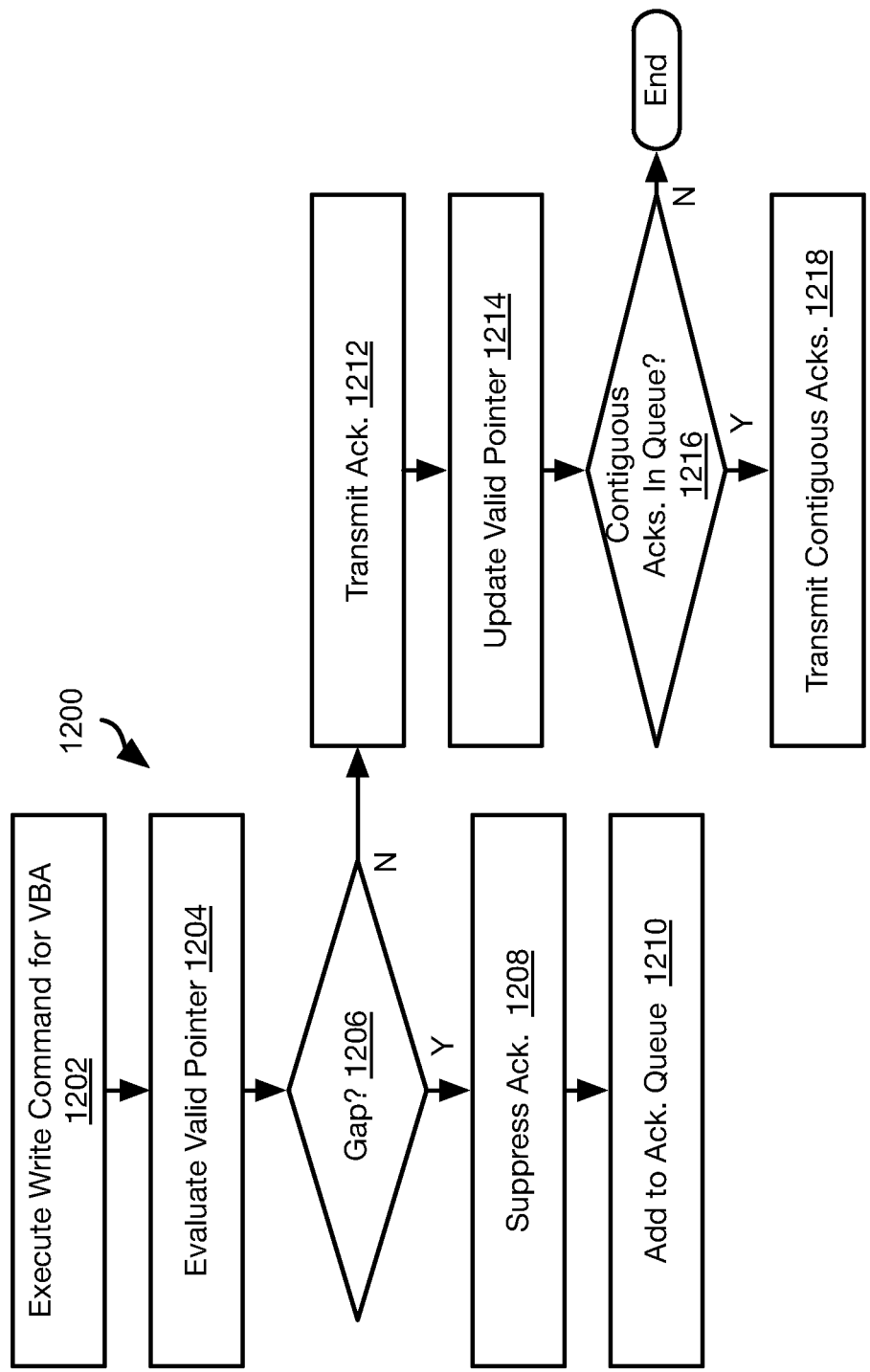
FIG. 12 is a process flow diagram of a method for enforcing ordered acknowledgment of write operations in accordance with an embodiment of the present invention.

Referring to FIG. 12, in some embodiments write commands for each slice are acknowledged by the leader node in VBA order, i.e. a write command assigned VBA X is acknowledged before a write command assigned VBA X+Y for any positive value of Y. When the leader node performs multiple disk writes in parallel for different VBAs, it is possible that a higher VBA can successfully complete before a lower VBA. In this case, the acknowledgement for the higher VBA is held back until the lower VBAs complete successfully. This order guarantees that there can never be holes in a segment. Therefore, when scanning a segment for valid data after a storage node restart or during resynchronization, one can stop at the first invalid data block encountered and be sure that nothing past that data block been acknowledged to the compute node 110 or other source of write commands.

This constraint ensures that no holes are present during the synchronization process of the method 1100. This restriction can be relaxed by enhancing the synchronization method 1100 to deal with VBA holes. Furthermore, in some embodiments, this ordering restriction is only enforced within segments, i.e. only acknowledgement for write commands to the same segment 416 need to be in VBA order and acknowledgement for writes to different segments need not be coordinated with one another. This constraint does not significantly impact performance since, in general, a write command for a lower VBA will ordinarily complete before a write command for a higher VBA since the write command for the higher VBA was issued later.

FIG. 12 illustrates an example method 1200 in which this constraint may be implemented. The method 1200 may be executed only by the primary node for the subject slice or may also be executed by a clone node for the subject slice.

The method 1200 may presume the maintenance of a valid pointer that records the VBA of the last completed write command. The method 1200 includes executing 1202 a write command for a particular VBA, such as according to the methods described hereinabove. The particular VBA may then be evaluated 1204 with respect to the valid pointer, if there is a gap between the particular VBA and the valid pointer, then transmission of an acknowledgement for the write command is suppressed 1208. An acknowledgment for the write command maybe added 1210 to a queue along with the particular VBA.

If no gap is found 1206 to be present, e.g., the particular VBA is one greater than the valid pointer, then an acknowledgment for the write command is transmitted to a source of the write command and the valid pointer is updated to be equal to the particular VBA.

If there are one or more acknowledgments previously added to the queue that are found 1216 to be contiguous with the particular VBA, then these one or more acknowledgments are also transmitted 1218 to the source of the write command. E.g., if the particular VBA is N, then acknowledgments for VBAs equal to N+1, N+2, etc. would be transmitted 1212 until a gap is found, e.g. N+3 would be transmitted but N+5 would not if N+4 was not present in the queue. The valid pointer is then updated 1214 to include the highest-valued VBA of the one or more contiguous VBAs. If a gap is present between the VBAs of acknowledgments in the queue and the particular VBA, then these are not sent any acknowledgments corresponding to the gaps are received.

Figure 13:
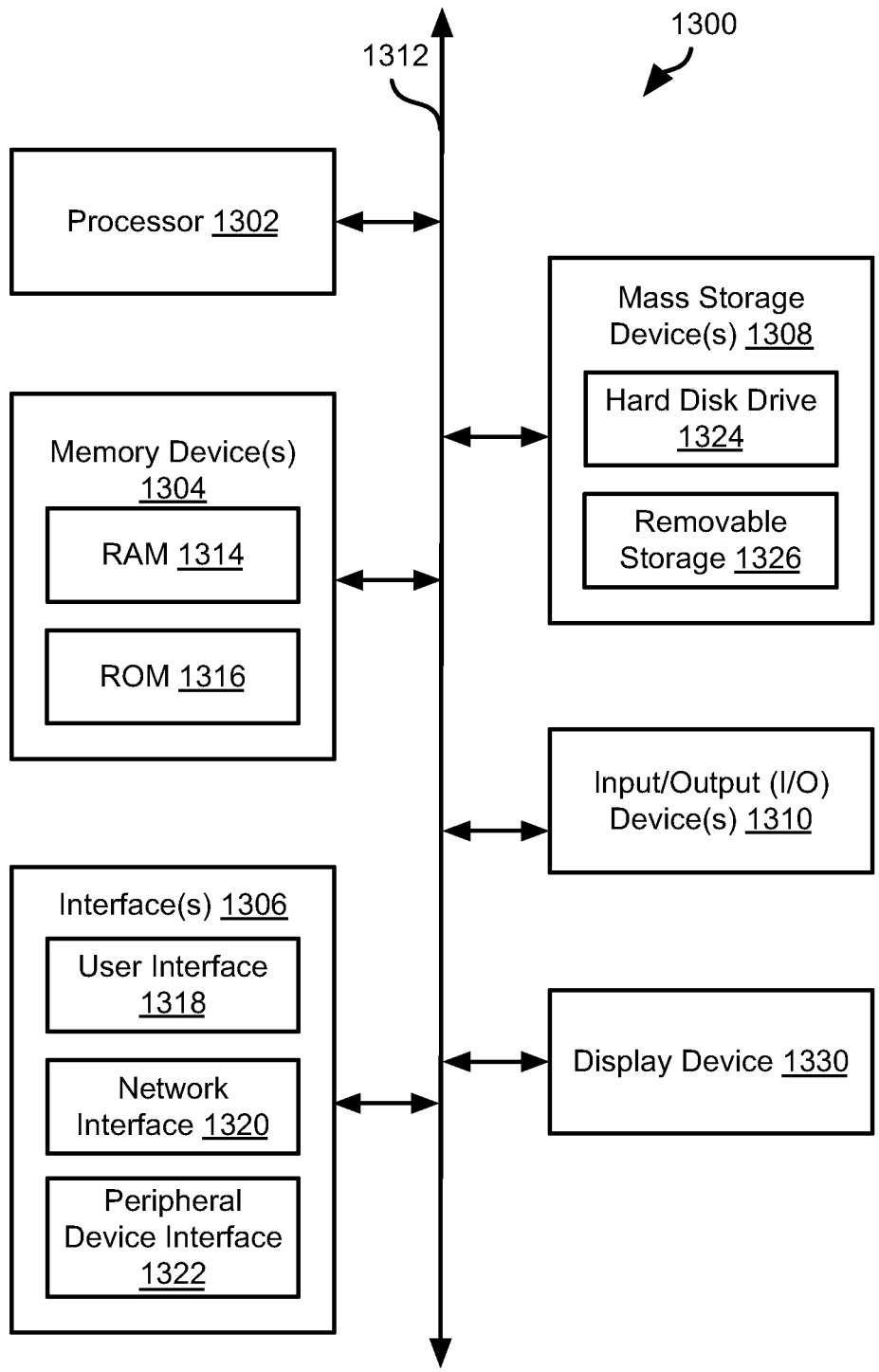
FIG. 13 is a schematic block diagram of an example computing device suitable for implementing methods in accordance with embodiments of the invention.

FIG. 13 is a block diagram illustrating an example computing device 1300. Computing device 1300 may be used to perform various procedures, such as those discussed herein. The storage manager 102, storage nodes 106, and compute nodes 110 may have some or all of the attributes of the computing device 1300.

Computing device 1300 includes one or more processor(s) 1302, one or more memory device(s) 1304, one or more interface(s) 1306, one or more mass storage device(s) 1308, one or more Input/output (I/O) device(s) 1310, and a display device 1330 all of which are coupled to a bus 1312. Processor(s) 1302 include one or more processors or controllers that execute instructions stored in memory device(s) 1304 and/or mass storage device(s) 1308. Processor(s) 1302 may also include various types of computer-readable media, such as cache memory.

Memory device(s) 1304 include various computer-readable media, such as volatile memory (e.g., random access memory (RAM) 1314) and/or nonvolatile memory (e.g., read-only memory (ROM) 1316). Memory device(s) 1304 may also include rewritable ROM, such as Flash memory.

Mass storage device(s) 1308 include various computer readable media, such as magnetic tapes, magnetic disks, optical disks, solid-state memory (e.g., Flash memory), and so forth. As shown in FIG. 13, a particular mass storage device is a hard disk drive 1324. Various drives may also be included in mass storage device(s) 1308 to enable reading from and/or writing to the various computer readable media. Mass storage device(s) 1308 include removable media 1326 and/or non-removable media.

I/O device(s) 1310 include various devices that allow data and/or other information to be input to or retrieved from computing device 1300. Example I/O device(s) 1310 include cursor control devices, keyboards, keypads, microphones, monitors or other display devices, speakers, printers, network interface cards, modems, lenses, CCDs or other image capture devices, and the like.

Display device 1330 includes any type of device capable of displaying information to one or more users of computing device 1300. Examples of display device 1330 include a monitor, display terminal, video projection device, and the like.

Interface(s) 1306 include various interfaces that allow computing device 1300 to interact with other systems, devices, or computing environments. Example interface(s) 1306 include any number of different network interfaces 1320, such as interfaces to local area networks (LANs), wide area networks (WANs), wireless networks, and the Internet. Other interface(s) include user interface 1318 and peripheral device interface 1322. The interface(s) 1306 may also include one or more peripheral interfaces such as interfaces for printers, pointing devices (mice, track pad, etc.), keyboards, and the like.

Bus 1312 allows processor(s) 1302, memory device(s) 1304, interface(s) 1306, mass storage device(s) 1308, I/O device(s) 1310, and display device 1330 to communicate with one another, as well as other devices or components coupled to bus 1312. Bus 1312 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1300, and are executed by processor(s) 1302. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A system comprising one or more processing devices and one or more memory devices operably coupled to the one or more processing devices, the one or more memory devices storing executable code effective to cause the one or more processing devices to:

receive first write input/output operations (IOPs) from one or more compute nodes; and for each first write input/output operation (IOP) from one of the one or more compute nodes, execute the each first write IOP with respect to a first copy of a first storage unit referenced by the each first write IOP by— assigning a first virtual block address (VBA) to a logical block address (LBA) referenced in the each first write IOP according to a VBA counter;
incrementing the VBA counter;
storing an association between the LBA and the first VBA;
writing data from the each first write IOP to a first physical storage location;
storing an association between the first physical storage location and the first VBA; and
transmitting the each first write IOP to a second storage node of a plurality of storage nodes with the first VBA;
receive second write IOPs from the plurality of storage nodes;
for each second write IOP received from a first storage node of the plurality of storage nodes, execute the each second write IOP with respect to a second copy of a second storage unit referenced by the each second write IOP by—
comparing a second VBA included with the each second write IOP to a second VBA counter;
if the second VBA is not consistent with the second VBA counter, notifying the first storage node that the second copy is not current;
if the second VBA is consistent with the second VBA counter—
incrementing the second VBA counter;
storing an association between a second LBA in the each second write IOP and the second VBA;
writing data from the each second write IOP to a second physical storage location;
storing an association between the second physical storage location and the VBA; and
transmitting an acknowledgment to the first storage node.

2. The system of claim 1, wherein the executable code is further effective to cause the one or more processing devices to, for each second write IOP received from the first storage node, execute the each second write IOP by:
if the second VBA is not consistent with the second VBA counter, refraining from executing the each second write IOP with respect to the second copy of the second storage unit referenced by the each second write IOP.

3. The system of claim 2, wherein the executable code is further effective to cause the one or more processing devices to, for each second write IOP received from the first storage node, execute the each second write IOP by, if the second VBA is not consistent with the VBA counter:
identifying a range of VBAs according to a difference between the second VBA and the VBA counter;
receiving third write IOPs corresponding to VBAs from the range of VBAs from the first storage node; and
executing each of the third write IOP and incrementing the VBA counter for each of the third write IOPs.

4. The system of claim 1, wherein the executable code is further effective to cause the one or more processing devices to write the data from the each first write IOP to the first physical location by:
if a first current segment allocated to a storage unit referenced in the each first write IOP is full, the first current segment having a current VSID (virtual segment identifier) associated with it in a first segment map—
allocating a first new segment of physical memory to the storage unit referenced in the each first write IOP as the first current segment;
assigning a new VSID (virtual segment identifier) from a VSID counter as the current VSID segment; and
incrementing the VSID counter;
storing a first association between the storage unit, the first new segment, and the new VSID in the first segment map; and
writing the data from the each first write TOP to the first current segment.

5. The system of claim 4, wherein the executable code is further effective to cause the one or more processing devices to transmit the current VSID with the each first write TOP to the second storage node of the plurality of storage nodes.

6. The system of claim 5, wherein the second storage node of the plurality of storage nodes is programmed to, for each first write TOP and current VSID received—
if the current VSID is not allocated to the storage unit referenced in the each first write TOP in a second segment map of the second storage node, the storage unit having a second current segment of physical memory allocated on the second storage node—
allocate a second new segment of physical memory to the storage unit referenced in the each first write TOP segment as the second current segment; and
store a second association between the storage unit, the second new segment, and the new VSID in the second segment map; and
write the data from the each first write TOP to the second current segment.

7. The system of claim 6, wherein the executable code is further effective to cause the one or more processing devices to, if an amount of data in the first new segment is below a threshold:
include, in the first write IOPs, copying write IOPs referencing valid data from the first new segment;
process the copying write IOPs with the first write IOPs in a same manner as the first write IOPs; and
transmit an instruction to the second storage node to free the new VSID.

8. The system of claim 6, wherein the executable code is further effective to cause the one or more processing devices to, if an amount of data written to the first new segment has filled the first new segment:
compute a first checksum of the first new segment; and
transmit the first checksum to the second storage node;
wherein the second storage node is further programmed to:
compute a second checksum of the second new segment; and
if the second checksum is not identical to the first checksum, invoke copying of the first new segment to the second new segment.

9. The system of claim 1, wherein the executable code is further effective to cause the one or more processing devices to:
for each first write IOP from one of the one or more compute nodes, acknowledge completion of the each first write IOP to the one of the one or more compute nodes only after acknowledging completion of all preceding first write IOPS of the first write IOPs regardless of an order of completion of the first write IOPs.

10. A method comprising:
receiving, by a subject storage node comprising a processing device, first write input/output operations (IOPs) from one or more compute nodes;
for each first write input/output operation (TOP) from one of the one or more compute nodes, executing, by the subject storage node, the each first write IOP with respect to a first copy of a first storage unit referenced by the each first write IOP by—
assigning a first virtual block address (VBA) to a logical block address (LBA) referenced in the each first write IOP according to a VBA counter;
incrementing the VBA counter;
storing an association between the LBA and the first VBA;
writing data from the each first write IOP to a first physical storage location;
storing an association between the first physical storage location and the first VBA;
transmitting the each first write IOP to a second storage node of a plurality of storage nodes with the first VBA;
receiving, by the subject storage node, second write IOPs from the plurality of storage nodes;
for each second write IOP received from a first storage node of the plurality of storage nodes, executing, by the subject storage node, the each second write IOP with respect to a second copy of a second storage unit referenced by the each second write IOP by—
comparing a second VBA included with the each second write IOP to a second VBA counter;
when the second VBA is not consistent with the second VBA counter, notifying the first storage node that the second copy is not current;
when the second VBA is consistent with the second VBA counter—
incrementing the second VBA counter;
storing an association between a second LBA in the each second write TOP and the second VBA;
writing data from the each second write TOP to a second physical storage location;
storing an association between the second physical storage location and the VBA; and
transmitting an acknowledgment to the first storage node.

11. The method of claim 10, wherein the subject storage node is further programmed to:
when the second VBA is not consistent with the second VBA counter, refraining from executing the each second write TOP with respect to the second copy of the second storage unit referenced by the each second write TOP.

12. The method of claim 11, further comprising, when the second VBA is not consistent with the VBA counter:
identifying, by the subject storage node, a range of VBAs according to a difference between the second VBA and the VBA counter;
receiving, by the subject storage node, third write IOPs corresponding to VBAs from the range of VBAs from the first storage node; and
executing, by the subject storage node, each of the third write IOP and incrementing the VBA counter for each of the third write IOPs.

13. The method of claim 10, further comprising writing, by the subject storage node, the data from the each first write IOP to the first physical location by:
when a first current segment allocated to a storage unit referenced in the each first write IOP is full, the first current segment having a current VSID (virtual segment identifier) associated with it in a first segment map—
allocating a first new segment of physical memory to the storage unit referenced in the each first write IOP as the first current segment;
assigning a new VSID (virtual segment identifier) from a VSID counter as the current VSID segment; and
incrementing the VSID counter;
storing a first association between the storage unit, the first new segment, and the new VSID in the first segment map; and
writing the data from the each first write IOP to the first current segment.

14. The method of claim 13, further comprising transmitting, by the subject storage node, the current VSID with the each first write IOP to the second storage node of the plurality of storage nodes.

15. The method of claim 14, further comprising, by the subject storage node, for each first write IOP and current VSID received—
when the current VSID is not allocated to the storage unit referenced in the each first write IOP in a second segment map of the second storage node, the storage unit having a second current segment of physical memory allocated on the second storage node—
allocating a second new segment of physical memory to the storage unit referenced in the each first write IOP segment as the second current segment; and
storing a second association between the storage unit, the second new segment, and the new VSID in the second segment map; and
writing the data from the each first write IOP to the second current segment.

16. The method of claim 15, further comprising, by the subject storage node, when an amount of data in the first new segment is below a threshold:
including, in the first write IOPs, copying write IOPs referencing valid data from the first new segment;
processing the copying write IOPs with the first write IOPs in a same manner as the first write IOPs; and
transmitting an instruction to the second storage node to free the new VSID.

17. The method of claim 15, further comprising, by the subject storage node, when an amount of data written to the first new segment has filled the first new segment:
computing a first checksum of the first new segment; and
transmitting the first checksum to the second storage node; and
by the second storage node:
computing a second checksum of the second new segment; and
when the second checksum is not identical to the first checksum, invoking copying of the first new segment to the second new segment.

18. The method of claim 10, further comprising, by the subject storage node:
for each first write IOP from one of the one or more compute nodes, acknowledging completion of the each first write IOP to the one of the one or more compute nodes only after completion of all preceding first write IOPS of the first write IOPs referencing the first storage unit regardless of an order of completion of the first write IOPs.

* * * * *

UNITED STATES PATENT AND TRADEMARK OFFICE
CERTIFICATE OF CORRECTION

PATENT NO. : 10,534,549 B2
APPLICATION NO. : 15/709296
DATED : January 14, 2020
INVENTOR(S) : Jagadish K. Mukku It is certified that error appears in the above-identified patent and that said Letters Patent is hereby corrected as shown below:

In the Claims

Columns 19 and 20, Claim 4, should read:
4. The system of claim 1, wherein the executable code is further effective to cause the one or more processing devices to write the data from the each first write IOP to the first physical location by: if a first current segment allocated to a storage unit referenced in the each first write IOP is full, the first current segment having a current VSID (virtual segment identifier) associated with it in a first segment map-- allocating a first new segment of physical memory to the storage unit referenced in the each first write IOP as the first current segment; assigning a new VSID (virtual segment identifier) from a VSID counter as the current VSID segment; and incrementing the VSID counter; storing a first association between the storage unit, the first new segment, and the new VSID in the first segment map; and writing the data from the each first write IOP to the first current segment.

Column 20, Claim 5, should read:
5. The system of claim 4, wherein the executable code is further effective to cause the one or more processing devices to transmit the current VSID with the each first write IOP to the second storage node of the plurality of storage nodes.

Column 20, Claim 6, should read:
6. The system of claim 5, wherein the second storage node of the plurality of storage nodes is programmed to, for each first write IOP and current VSID received-- if the current VSID is not allocated to the storage unit referenced in the each first write IOP in a second segment map of the second storage node, the storage unit having a second current segment of physical memory allocated on the second storage node-- allocate a second new segment of physical memory to the storage unit referenced in the each first write IOP segment as the second current segment; and store a second association between the storage unit, the second new segment, and the new VSID in Signed and Sealed this
Fifth Day of May, 2020

Andrei Iancu
*Director of the United States Patent and Trademark Office*

CERTIFICATE OF CORRECTION (continued)
U.S. Pat. No. 10,534,549 B2 the second segment map; and write the data from the each first write IOP to the second current segment.

Columns 20 and 21, Claim 10 should read:
10. A method comprising: receiving, by a subject storage node comprising a processing device, first write input/output operations (IOPs) from one or more compute nodes; for each first write input/output operation (IOP) from one of the one or more compute nodes, executing, by the subject storage node, the each first write IOP with respect to a first copy of a first storage unit referenced by the each first write IOP by-- assigning a first virtual block address (VBA) to a logical block address (LBA) referenced in the each first write IOP according to a VBA counter; incrementing the VBA counter; storing an association between the LBA and the first VBA; writing data from the each first write IOP to a first physical storage location; storing an association between the first physical storage location and the first VBA; transmitting the each first write IOP to a second storage node of a plurality of storage nodes with the first VBA; receiving, by the subject storage node, second write IOPs from the plurality of storage nodes; for each second write IOP received from a first storage node of the plurality of storage nodes, executing, by the subject storage node, the each second write IOP with respect to a second copy of a second storage unit referenced by the each second write IOP by-- comparing a second VBA included with the each second write IOP to a second VBA counter; when the second VBA is not consistent with the second VBA counter, notifying the first storage node that the second copy is not current; when the second VBA is consistent with the second VBA counter-- incrementing the second VBA counter; storing an association between a second LBA in the each second write IOP and the second VBA; writing data from the each second write IOP to a second physical storage location; storing an association between the second physical storage location and the VBA; and transmitting an acknowledgment to the first storage node.

Column 21, Claim 11, should read:
11. The method of claim 10, wherein the subject storage node is further programmed to: when the second VBA is not consistent with the second VBA counter, refraining from executing the each second write IOP with respect to the second copy of the second storage unit referenced by the each second write IOP.